United States Patent [19]

Niwa et al.

[11] Patent Number: 4,645,832
[45] Date of Patent: Feb. 24, 1987

[54] CELLULOSE FIBER-REACTIVE DISAZO OR TRISAZO DYES HAVING A TRIAZINE RING SUBSTITUTED BY A(B-SULFATOETHYL) SULFONYLANILINO GROUP

[75] Inventors: Toshio Niwa, Kanagawa; Yoshiaki Kato, Tokyo, both of Japan

[73] Assignee: Mitsubishi Chemical Industries Limited, Tokyo, Japan

[21] Appl. No.: 721,514

[22] Filed: Apr. 9, 1985

[30] Foreign Application Priority Data

Apr. 9, 1984 [JP] Japan .................................. 59-70549
Apr. 25, 1984 [JP] Japan .................................. 59-83569
Apr. 27, 1984 [JP] Japan .................................. 59-85509

[51] Int. Cl.$^4$ .................... C09B 62/09; C09B 62/453; C09B 62/533; D06P 1/382
[52] U.S. Cl. .................................. 534/637; 534/617; 534/642; 534/829; 534/832; 534/845; 534/850; 534/875; 534/876
[58] Field of Search ........................ 534/617, 637, 642

[56] References Cited

U.S. PATENT DOCUMENTS 3,223,470 12/1965 Boedeker et al. ............... 534/638 X
4,378,313 5/1983 Kayane et al. ................... 534/642 X
4,412,948 11/1983 Omura et al. ........................ 534/637
4,425,270 1/1984 Yamada et al. ...................... 534/637

FOREIGN PATENT DOCUMENTS 56-100861 8/1981 Japan .................................. 534/637

Primary Examiner—Floyd D. Higel
Attorney, Agent, or Firm—Sughrue, Mion, Zinn, Macpeak, and Seas

[57] ABSTRACT

Reactive azo dyes represented by the general formula (I) or (II):

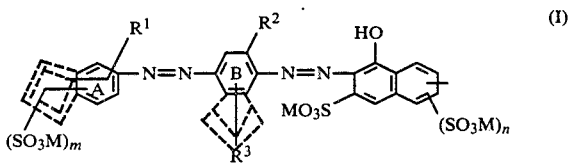

(I)

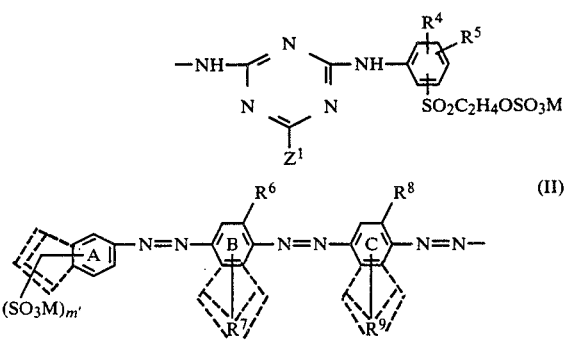

(II)

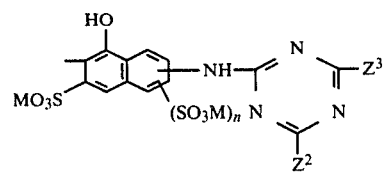

wherein M is a hydrogen atom or an alkali metal, $R^1$ is a hydrogen atom, a chlorine atom, a lower alkyl group, a lower alkoxy group, a nitro group or a carboxyl group, $R^2$ and $R^8$ are a lower alkyl group, a lower alkoxy group or a sulfonic acid group, $R^3$, $R^7$ and $R^9$ are a hydrogen atom, a lower alkyl group, a lower alkoxy group, an acetylamino group or a sulfonic acid group, $R^4$ and $R^5$ are a hydrogen atom, a methyl group, a methoxy group or a sulfonic acid group, $R^6$ is a hydrogen atom, a lower alkyl group, a lower alkoxy group or a sulfonic acid group, $Z^1$ is a chlorine atom, a fluorine atom, an aliphatic or an aromatic amino residual group, a methoxy group or a phenoxy group, $Z^2$ is the same one as $Z^1$ when $Z^3$ is

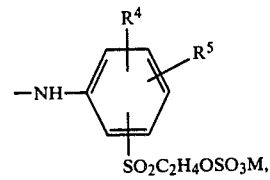

$Z^2$ is a chlorine atom or a fluorine atom when $Z^3$ is an aliphatic amino residual group, an aromatic amino residual group except

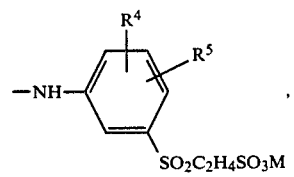

a methoxy group or a phenoxy group, $Z^3$ is

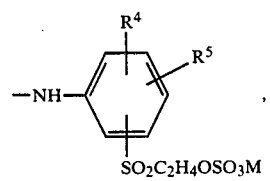

an aliphatic amino residual group, an aromatic amino residual group except

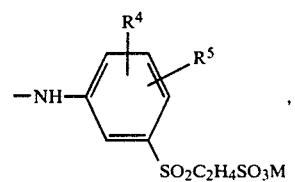
a methoxy group, or a phenoxy group, m is 1, 2 or 3, m' is 2 or 3, n is 0 or 1, and the benzene rings A, B and C may be naphthalene rings.
6 Claims, No Drawings

CELLULOSE FIBER-REACTIVE DISAZO OR TRISAZO DYES HAVING A TRIAZINE RING SUBSTITUTED BY A(B-SULFATOETHYL) SULFONYLANILINO GROUP

FIELD OF THE INVENTION

This invention relates to novel reactive azo dyes.

BACKGROUND OF THE INVENTION

Up to now, the dyeing of cellulose fiber was carried out with a reactive dye at pH 10 and over in the presence of an acid capturing agent such as sodium carbonate, potassium carbonate, sodium hydroxide and the like and an electrolyte such as sodium chloride, sodium sulfate and the like at a temperature of about 100° C. and below.

However, since in recent years the demand for the mixed spinning of cellulose with other fibers, especially polyester fiber, is increasing, it is necessary to employ dyes and dyeing conditions suitable for cellulose and polyester fibers respectively, for dyeing of such cellulose/polyester mixed fiber (hereinafter merely referred to as c/p fiber). This is because the dye and dyeing conditions for polyester fiber are considerably different from those for cellulose fiber. That is, it is necessary to use a disperse dye for the dyeing of polyester fiber at a temperature of about 130° C.

If the c/p fiber above is dyed in the same process at once, for example, the dyeing has to be carried out by using two different dyes and by means of a combination of a reactive dye and a disperse dye, but it has some problems. For example, in order to exhaust the cellulose fiber part fully with a reactive dye, the pH value has to be kept at 10 and over by the addition of an acid capturing agent. However, the presence of the acid capturing agent accelerates the decomposition of the disperse dye to give poor exhaustion of the polyester fiber part. On the other hand, a high temperature condition is required in order that the polyester fiber part is exhausted by a disperse dye. However, the hydrolysis of the disperse dye is accelerated under the high pH value stated above and the high temperature, and thus, exhaustion of the cellulose fiber becomes extremely inferior. Accordingly, the two-bath method, that is, one of cellulose or polyester fiber is dyed first and then the other is dyed by another bath, has been generally employed for dyeing of c/p fiber.

SUMMARY OF THE INVENTION

The object of this invention is to provide novel reactive azo dyes being able to dye cellulose fiber under the condition and pH value which are employed for dyeing of polyester fiber with a disperse dye.

That is, this invention relates to reactive azo dyes represented by the general formula (I) or (II):

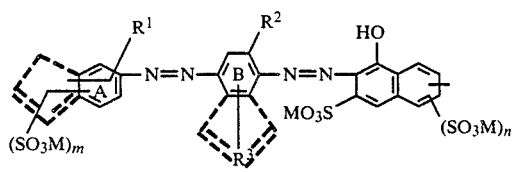

(I)

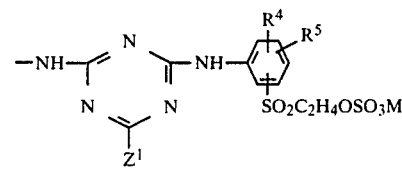

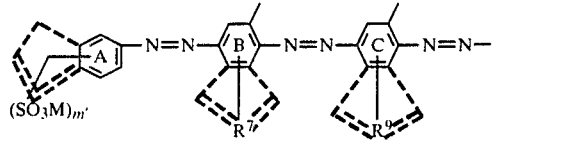

(II)

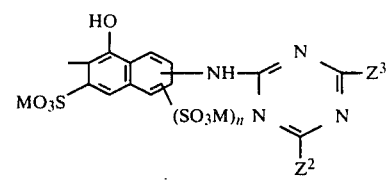

wherein M is a hydrogen atom or an alkali metal, $R^1$ is a hydrogen atom, a chlorine atom, a lower alkyl group, a lower alkoxy group, a nitro group or a carboxyl group, $R^2$ and $R^8$ are a lower alkyl group, a lower alkoxy group or a sulfonic acid group, $R^3$, $R^7$ and $R^9$ are a hydrogen atom, a lower alkyl group, a lower alkoxy group, an acetylamino group or a sulfonic acid group, $R^4$ and $R^5$ are a hydrogen atom, a methyl group, a methoxy group or a sulfonic acid group, $R^6$ is a hydrogen atom, a lower alkyl group, a lower alkoxy group or a sulfonic acid group, $Z^1$ is a chlorine atom, a fluorine atom, an aliphatic or aromatic amino residual group, a methoxy group or a phenoxy group, $Z^2$ is the same one as $Z^1$ when $Z^3$ is

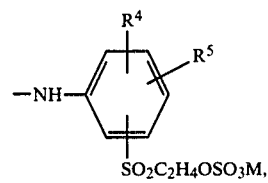

$Z^2$ is a chlorine atom or a fluorine atom when $Z^3$ is an aliphatic amino residual group, an aromatic amino residual group except

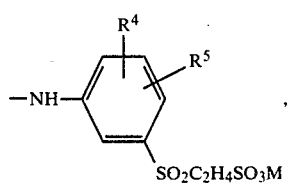

a methoxy group or a phenoxy group, $Z^3$ is

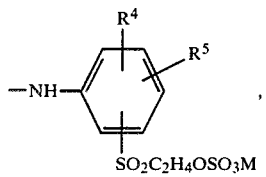

an aliphatic amino residual group, an aromatic amino residual group except

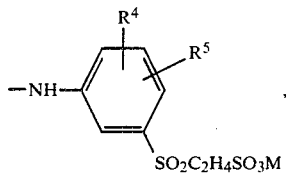

a methoxy group or a phenoxy group, m is 1, 2 or 3, m' is 2 or 3, n is 0 or 1, the benzene rings A, B and C may be naphthalene rings.

DETAILED DESCRIPTION OF THE INVENTION

In the reactive azo dyes of this invention represented by the general formula (I) or (II), a sodium and potassium can be employed as an alkali metal represented by M. As lower alkyl and alkoxy groups represented by $R^1$, $R^2$, $R^3$, $R^6$, $R^7$, $R^8$ and $R^9$, alkyl and alkoxy groups having 1 to 4 carbon atoms can be illustrated. As aliphatic or aromatic amino residual groups represented by $Z^1$, $Z^2$ and $Z^3$, an amino group, an alkylamino group having 1 to 4 carbon atoms, an ethanolamino group, a β-cyanoethylamino group, a β-sulfoethylamino group, a glycine residual group, an anilino group and an anilino group substituted with a sulfo group, a chlorine atom, a lower alkyl group, a lower alkoxy group, a nitro group and a carboxyl group can be illustrated.

The reactive azo dye represented by the general formula (I) stated above can be prepared by the following procedure: For example, the usual diazotization and coupling can be carried out with the compound represented by the general formulae (III) and (IV):

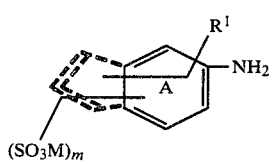

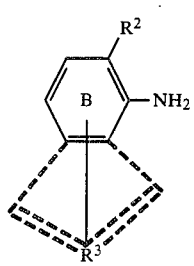

to give the monoazo compound represented by the general formula (V).

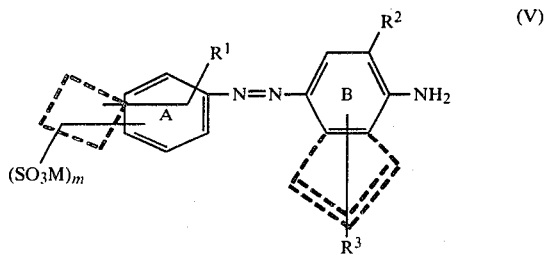

On the other hand, the compounds represented by the general formulae (VI), (VII) and (VIII):

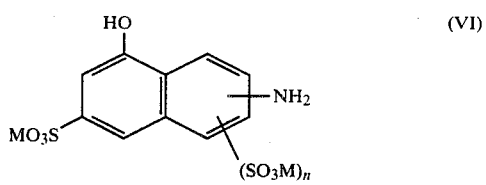

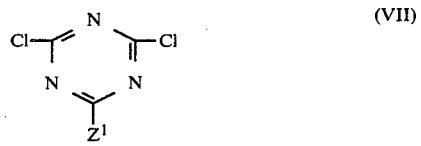

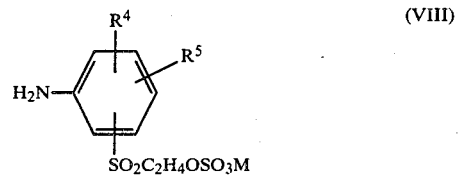

can be condensed each other in an aqueous medium in any order to prepare the compound represented by the general formula (IX).

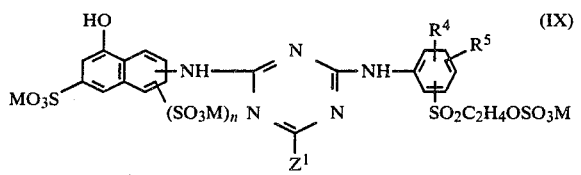

Then, the monoazo compound of the general formula (V) can be converted to the diazonium compound by the usual diazotization, and the diazonium compound is coupled with the compound represented by the formula (IX) to obtain the reactive azo dyes of the general formula (I) stated above.

The reactive trisazo dyes represented by the general formula (II) stated above involve two kinds of the compounds represented by the general formulae (II-1) and (II-2).

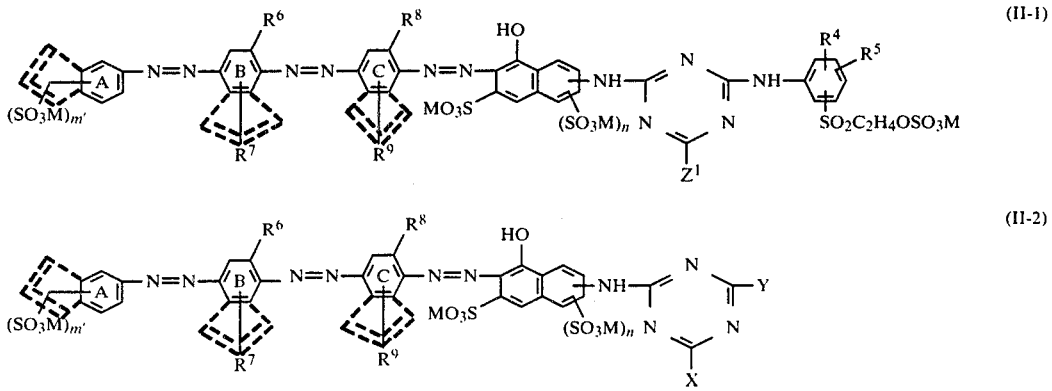

wherein X is a chlorine atom or a fluorine atom, Y is an aliphatic amino residual group, an aromatic amino residual group except

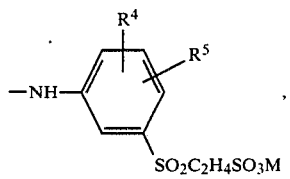

a methoxy group or a phenoxy group, and $R^4$, $R^5$, $R^6$, $R^7$, $R^8$, $R^9$, M $Z^1$, m' and n are the same meanings as defined hereinbefore.

The trisazo compound represented by the general formula (II-1) stated above can be prepared by the following procedure: For example, the usual diazotization and coupling can be carried out twice with the compounds represented by the general formulae (X), (XI) and (XII):

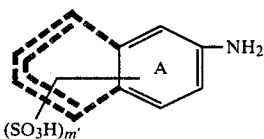

(X)

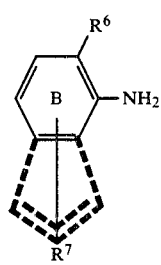

(XI)

(XII)

to give the disazo compound represented by the general formula (XIII).

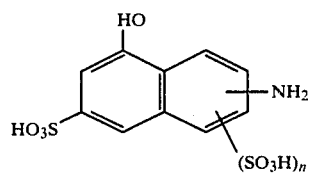

(XIII)

Then, the disazo compound of the general formula (XIII) stated above can be converted to the diazonium compound in water-acetic acid medium by diazotization, and then the diazonium compound obtained is coupled with the compound represented by the general formula (IX) stated above to obtain the trisazo compound of the general formula (II-1) stated above.

Also, the trisazo compound represented by the general formula (II-2) can be prepared by the following procedure: For example, the compounds represented by the following formulae (XIV), (XV) and (XVI):

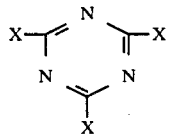

(XIV)

(XV)

Y—H (XVI)

can be condensed each other in an aqueous medium in any order to prepare the compound represented by the general formula (XVII):

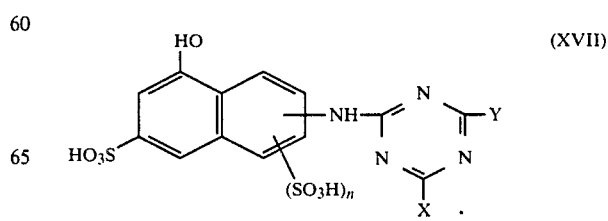

(XVII)

Then, the disazo compound of the general formula (XIII) stated above can be converted to the diazonium compound in water-acetic acid medium by diazotization, and the diazonium compound obtained can be coupled with the compound represented by the general formula (XVII) stated above to obtain the trisazo compound of the general formula (II-2) stated above.

As fibers which can be dyed with reactive azo dyes of this invention, cellulose fiber such as cotton, viscose rayon, cupra ammonium rayon and hemp, can be illustrated. Also, cellulose fiber in mixed cellulose fibers with polyester, triacetate, polyacrylonitrile, polyamido, wool, silk and the like can be excellently dyed.

In dyeing method for fibers using reactive azo dyes of this invention, dyeing can be carried out by adding a dyestuff which is needful for dyeing of fibers other than cellulose, e.g., a disperse dye and the like stated in Color Index (Third Edition), into the bath at the same time.

In case of dyeing of cellulose fibers with a reactive azo dye of this invention, for example, a bath can be prepared by adding a reactive azo dye represented by the general formula (I) or (II), a buffer which is required to keep the bath at pH 5 to 10 (for example, in general, about 0.5 to 5.0 g of an acid such as carbonic acid, phosphonic acid, citric acid and the like, a sodium salt or a potassium salt with these acid or a mixture thereof per liter), and if necessary, by adding an electrolyte (in general, about 1 to 150 g of sodium chloride, sodium sulfate and the like per liter), and a cellulose fiber is put in the bath, and then dyeing can be carried out by heating the bath for 30 to 50 minutes at temperature of 100° to 150° C.

When mixed fiber and knitted goods made by spinning or knitting cellulose fiber with other fibers, for example, polyester fiber, are dyed, the cellulose and polyester fibers can be dyed at the same time by adding a reactive azo dye represented by the general formula (I) or (II) and a disperse dye stated in Color Index into the bath above according to one-bath one-process method.

Furthermore, in the case of dyeing the mixed fiber and knitted goods above, the one-bath two-process method heretofore in use, that is, either fiber is dyed and then the other fiber is dyed, may be applied to dye cellulose and other fibers in each bath by combination of dyeing method using a reactive azo dye of this invention with dyeing method for other fibers other than cellulose.

The method of this invention is described in detail later by means of examples but is not limited to the examples.

EXAMPLE 1

10 g of unmercerized cotton knitted goods are put in a path at pH 7 which is prepared by adding 0.2 g of the reactive azo dye in free form represented by the following formula:

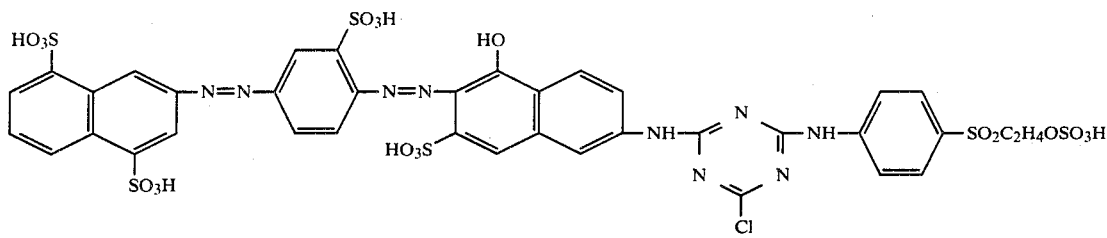

[λmax: 518 nm (water)]

16 g of sodium sulfate, 0.4 g of $Na_2HPO_4.12H_2O$ as a buffer and 0.1 g of $KH_2PO_4$ into 200 ml of water, and the bath is heated to 120° C. for 30 minutes. After dyeing for 60 minutes at the same temperature, the goods dyed are washed with water, soaped, washed with water and dried to give the dyed goods in clear red. The degree of exhaustion of the present dye is very excellent, and the color of dyed goods obtained is extreme density. Each of their light fastness, fastness to chlorine and fastness to light perspiration is fine.

Further, the reactive azo dye used in the present example can be prepared by the following procedure: The monoazo compound represented by the following formula:

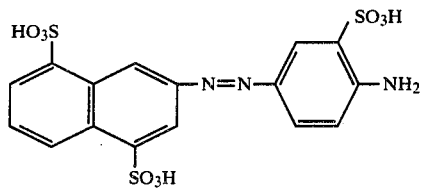

can be prepared by the usual diazotization and coupling of 30.3 g of 2-naphthylamine-4,8-disulfonic acid with 17.3 g of 1-aminobenzene-2-sulfonic acid. On the other hand, after condensing of 23.9 g of 2-amino-5-hydroxynaphthalene-7-sulfonic acid with 18.5 g of cyanuric chloride at 5° C. below, the compound obtained is further condensed with 28.1 g of sulfonic acid ester of 4-(β-hydroxyethyl)sulfonylaniline at 30° to 35° C. to prepare the compound represented by the following formula:

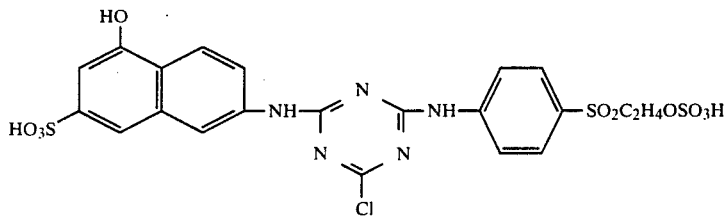

and then to this reaction solution, the diazo solution prepared from the monoazo compound stated above by the usual diazotization is added. After coupling, the reaction mixture is salted out with potassium chloride to obtain the reactive disazo dye stated above.

EXAMPLE 2

10 g of undyed silk cotton knitted goods are put in a bath which is prepared by adding 0.2 g of reactive azo dye in free form represented by the following formula:

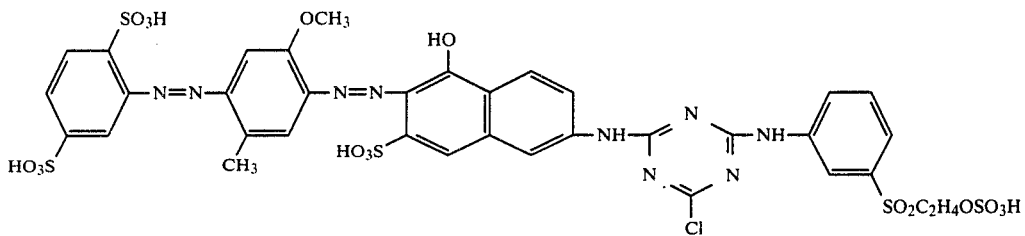

[λmax: 564 nm (water)]

16 g of sodium sulfate, 0.5 g of Na₂HPO₄.12H₂O as a buffer and 0.02 g of KH₂PO₄ into 200 ml of water, the bath is heated to 130° C. for 30 minutes. After dyeing for 30 minutes at the same temperature, the goods dyed are washed with water, soaped, washed with water and dried to give the dyed goods in deep blue. The pH of the bath is maintained at 8 from the beginning to the end of dyeing. The color of the dyed goods is extreme density, and each of their light fastness, fastness to chlorine and fastness to light perspiration is fine.

Further, the reactive azo dye used in the present example can be prepared by the following procedure: The monoazo compound represented by the following formula:

can be prepared by the usual diazotization and coupling of 25.3 g of aniline-2,5-disulfonic acid with 13.7 g of 2-methoxy-5-methylaniline. On the other hand, after condensing of 23.9 g of 2-amino-5-hydroxynaphthalene-7-sulfonic acid with 18.5 g of cyanuric chloride at 5° C. below, the compound obtained is further condensed with 28.1 g of sulfonic acid ester of 3-(β-hydroxyethyl)-sulfonylaniline at 30° to 35° C. to prepare the compound represented by the following formula:

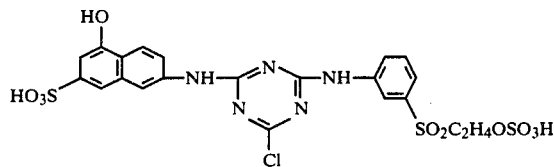

and then to this reaction solution, the diazo solution prepared from the monoazo compound stated above by the usual diazotization is added. After coupling, the reaction mixture is dried with spray to give the reactive disazo dye used in the present example.

EXAMPLE 3

10 g of mixed fiber of polyester with cotton (50:50) are put in a bath which is prepared by adding 0.2 g of the reactive dye in free form represented by the following formula:

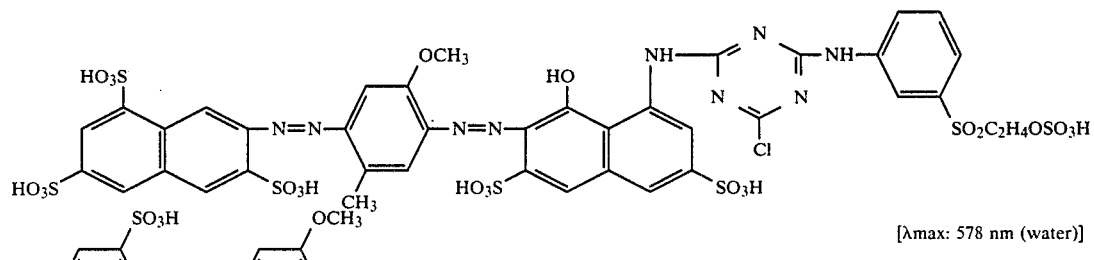

[λmax: 578 nm (water)]

0.2 g of the monoazo dye represented by the following formula:

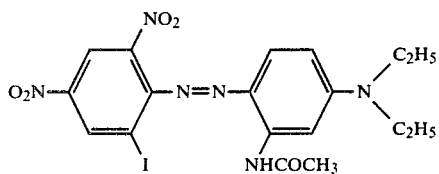

12 g of sodium sulfate, 0.4 g of Na₂HPO₄.12H₂O as a buffer and 0.1 g of KH₂PO₄ into 200 ml of water, the bath is heated to 130° C. for 30 minutes. After dyeing for 60 minutes at the same temperature, the goods dyed are washed with water, soaped, washed with water and dried to give the dyed goods in blue having a fine color equality. The pH of the bath is maintained at 8 from the beginning to the end of dyeing. Their exhaustibility is very fine, and the color of the dyed goods is extreme density. Each of their light fastness, fastness to chlorine and fastness to light perspiration is fine.

Still more, the reactive disazo dye used in the present example can be prepared by the following procedure: The monoazo compound represented by the following formula:

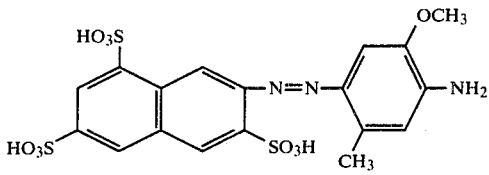

can be prepared by the usual diazotization and coupling of 38.3 g of 2-naphthylamine-3,6,8-trisulfonic acid with 13.7 g of 2-methoxy-5-methylaniline. On the other hand, after condensing of 31.9 g of 1-amino-8-hydroxynaphthalene-3,6-disulfonic acid with 18.5 g of cyanuric chloride at 5° C. below, the compound obtained is further condensed with 28.1 g of sulfonic acid ester of 3-(β-hydroxyethyl)sulfonylaniline to prepare the compound represented by the following formula:

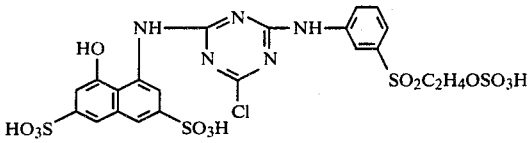

and then to this reaction solution, diazo solution prepared from the monoazo compound stated above by the usual diazotization is added. After coupling, the reaction mixture is salted out with potassium chloride to obtain the reactive dye stated above.

EXAMPLE 4

By a similar method to Example 1 cottons are dyed with reactive disazo dyes represented by the general formula (I), and results obtained are shown in Table 1.

TABLE 1
| No. | (MO₃S)ₘ ⌬ A R¹ | R² ⌬ B R³ | ⌬ (SO₃M)ₙ | –Z¹ | R⁴ ⌬ R⁵ SO₂C₂H₄OSO₃M | color of cotton | λmax (nm) (water) |
|---|---|---|---|---|---|---|---|
| 4-1 |  |  |  | –Cl |  | violet | 564 |
| 4-2 |  |  |  | –Cl |  | reddish blue | 575 |

TABLE 1-continued

[Structure I shown: bisazo dye with naphthol core bearing OH, (SO₃M)ₙ, MO₃S, linked via N=N to ring B (with R², R³ substituents), then N=N to ring A (with R¹, (MO₃S)ₘ); and NH-triazine (Z¹) linked to anilino group with R⁴, R⁵, SO₂C₂H₄OSO₃M]

| No. | A ring | Naphthol | B ring | Z¹ | Aniline | Color | λmax |
|---|---|---|---|---|---|---|---|
| 4-3 | 3-HO₃S-C₆H₄– | 1-SO₃H naphthalene | 1-HO, 3-SO₃H naphthalene | –NH–C₆H₄–SO₃H (m) | C₆H₄(m-SO₂C₂H₄OSO₃H) | reddish violet | 535 |
| 4-4 | 2-SO₃H, 5-CH₃ phenyl | 3-OCH₃ naphthalene (with SO₃H) | 1-HO, 3-SO₃H, SO₃H naphthalene | –Cl | 2,5-dimethyl-SO₂C₂H₄OSO₃H phenyl | blue | 590 |
| 4-5 | 2-SO₃H, 5-OCH₃ phenyl | 1-SO₃H naphthalene | 1-HO, 3-SO₃H, SO₃H naphthalene | –F | 2-CH₃, 5-OCH₃, SO₂C₂H₄OSO₃H phenyl | violet | 560 |

TABLE 1-continued $$[\text{I}]$$

| No. | A ring (R¹, (MO₃S)ₘ) | B ring (R², R³) | Naphthol part (SO₃M)ₙ | R⁴/R⁵ (aniline) | Color | λmax (nm) |
|---|---|---|---|---|---|---|
| 4-6 | 4-NO₂, 2-SO₃H phenyl | 2-SO₃H naphthyl | 1-HO, 3-SO₃H, 8-? naphthyl | —NH₂ | 2-SO₃H, 4-SO₂C₂H₄OSO₃H (2-Me) | violet | 552 |
| 4-7 | 4-COOH phenyl | 2-SO₃H phenyl | 1-HO, 3-SO₃H naphthyl | —NHCH₂CH₂SO₃H | 3-SO₂C₂H₄OSO₃H phenyl | bluish red | 523 |
| 4-8 | 4-SO₃H, 2-Cl phenyl | 2-SO₃H phenyl | 1-HO, 3-SO₃H, 8-SO₃H naphthyl | —NHCH₂COOH | 3-SO₂C₂H₄OSO₃H phenyl | red | 520 |
| 4-9 | 1,5-di-SO₃H naphthyl | 2,5-di-CH₃ phenyl | 1-HO, 3-SO₃H, 6-SO₃H naphthyl | —NH₂ | 3-SO₂C₂H₄OSO₃H phenyl | violet | 561 |

TABLE 1-continued

Structure [I]:

Compound of formula [I] with substituents A (with (MO₃S)ₘ and R¹), B (with R² and R³), azo-linked naphthalene with OH, MO₃S, (SO₃M)ₙ, NH-triazine bearing Z¹ and NH-phenyl (with R⁴, R⁵, SO₂C₂H₄OSO₃M).

| No. | A | B | naphthol | R³ | R⁴-phenyl-R⁵ | color | λ |
|---|---|---|---|---|---|---|---|
| 4-10 | naphthalene-1,5-disulfonic acid (HO₃S, SO₃H) | 2,5-dimethyl-4-butyl (C₄H₉(n), CH₃) | 1-hydroxy-naphthalene-3,6-disulfonic acid (HO, HO₃S, SO₃H) | —Cl | 4-methylphenyl-SO₂C₂H₄OSO₃H | violet | 561 |
| 4-11 | naphthalene-1,5-disulfonic acid (HO₃S, SO₃H) | 4-ethoxy-8-sulfo-naphthyl (OC₂H₅, HO₃S) | 1-hydroxy-naphthalene-3,6-disulfonic acid (HO, HO₃S, SO₃H) | —OCH₃ | 3-methylphenyl-SO₂C₂H₄OSO₃H | blue | 590 |
| 4-12 | naphthalene-1,5-disulfonic acid (HO₃S, SO₃H) | 4-sulfo-naphthyl (SO₃H) | 1-hydroxy-naphthalene-3,6-disulfonic acid (HO, HO₃S, SO₃H) | —O-phenyl | 3-methylphenyl-SO₂C₂H₄OSO₃H | violet | 563 |

TABLE 1-continued

| | A ring | B ring (R², R³) | Coupler | R⁴, R⁵ | Color | λmax |
|---|---|---|---|---|---|---|
| 4-13 | 1,5-naphthalenedisulfonic acid | 2,5-dimethyl SO₃H | 1-hydroxy-naphthalene with SO₃H groups | —F | bluish red | 526 |
| 4-14 | 1,6-naphthalenedisulfonic | 4-OC₄H₉(n), CH₃ | 1-hydroxy-naphthalene with SO₃H groups | —Cl | blue | 578 |
| 4-15 | 2,6-naphthalenedisulfonic | 2,5-dimethyl SO₃H | 1-hydroxy-naphthalene with SO₃H groups | —NHC₂H₄OH | bluish red | 525 |
| 4-16 | 1,4-disulfo-3-nitronaphthalene | 1,4-dimethylnaphthalene SO₃H | 1-hydroxy-naphthalene with SO₃H groups | —NHC₂H₄CH | violet | 565 |

TABLE 1-continued
[I]
| | | | | | | |
|---|---|---|---|---|---|---|
| 4-17 | 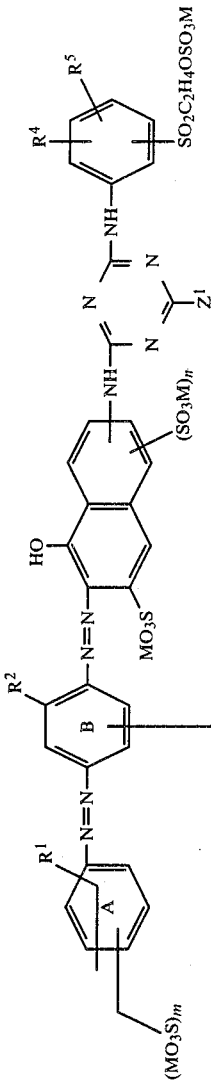 | 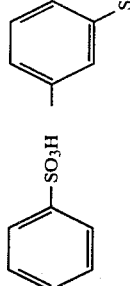 | 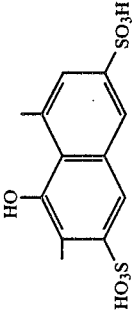 | —NH— | 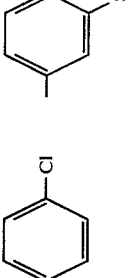 | bluish red | 524 |
| 4-18 | | | | —NH— | | bluish red | 534 |
| 4-19 | | | | —NH— | | blue | 585 |
| 4-20 | | | | —NH— | | violet | 560 |

TABLE 1-continued

[Structural formula [I] with substituents R¹, R², R³, R⁴, R⁵, (SO₃M)ₘ, (SO₃M)ₙ, and SO₂C₂H₄OSO₃M shown with rings A and B connected by azo linkages]

| No. | A ring | B ring | Coupler | R² | Aryl-SO₂C₂H₄OSO₃H | Color | λmax |
|---|---|---|---|---|---|---|---|
| 4-21 | 2,6-disulfonaphthalene (HO₃S positions) | OC₂H₅, NHCOCH₃ substituted phenyl | 8-methyl-1-hydroxy-3-sulfo-naphthalene with SO₃H | —NH— (p-NO₂-phenyl) | p-tolyl-SO₂C₂H₄OSO₃H | blue | 588 |
| 4-22 | 1-sulfonaphthalene | naphthalene-SO₃H | 8-methyl-1-hydroxy-3-sulfo-naphthalene with SO₃H | —NH— (p-CH₃-phenyl) | p-tolyl-SO₂C₂H₄OSO₃H | violet | 560 |
| 4-23 | 1-sulfonaphthalene | SO₃H substituted xylene | 8-methyl-1-hydroxy-3-sulfo-naphthalene with SO₃H | —NH— (p-OCH₃-phenyl) | p-tolyl-SO₂C₂H₄OSO₃H | bluish red | 525 |
| 4-24 | 4,7-disulfonaphthalene | OCH₃, CH₃ substituted phenyl | 8-methyl-1-hydroxy-3-sulfo-naphthalene with SO₃H | —Cl | p-tolyl-SO₂C₂H₄OSO₃H | blue | 575 |

EXAMPLE 5

10 g of undyed silk cotton knitted goods are put in a bath which is prepared by adding 0.2 g of the reactive trisazo dye in free form represented by the following formula:

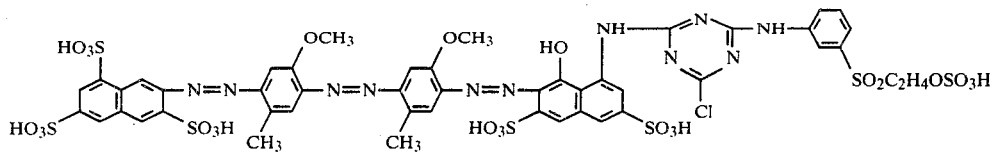

[λmax: 590 nm (water)]

16 g of sodium sulfate, 0.4 g of $Na_2HPO_4.12H_2O$ as a buffer and 0.1 g of $KH_2PO_4$ into 200 ml of water, the bath is heated to 120° C. for 30 minutes. After dyeing for 60 minutes at the same temperature, the goods dyed are washed with water, soaped, washed with water and dried to give the dyed goods in greenish deep blue. The degree of their exhaustion is very excellent, and the color of the dyed goods obtained is extreme density. Each of their light fastness, fastness to chlorine and fastness to light perspiration is fine.

Further, the trisazo compound used in the present example can be prepared by the following procedure: The disazo compound represented by the following formula:

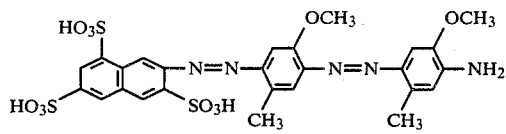

can be prepared by the usual diazotization and coupling of 13.7 g of 2-methoxy-5-methylaniline with the monoazo compound prepared by the usual diazotization and coupling of 38.3 g of 2-naphthylamine-3,6,8-trisulfonic acid with 13.7 g of 2-methoxy-5-methylaniline. On the other hand, after condensing of 31.9 g of 1-amino-8-hydroxynaphthalene-3,6-disulfonic acid with 18.5 g of cyanuric chloride at 5° C. below, the compound obtained is further condensed with 28.1 g of sulfonic acid ester of 3-(β-hydroxyethyl)sulfonylaniline at 30° to 35° C. to prepare the compound represented by the formula:

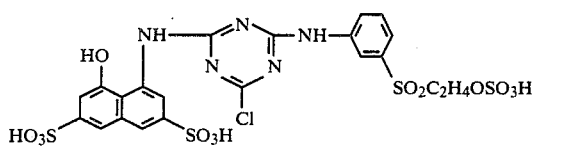

and then to this reaction solution, the diazo solution prepared from the disazo compound stated above by diazotization in water-acetic acid medium is added. After coupling, the reaction mixture is salted out with potassium chloride to obtain the trisazo compound stated above.

EXAMPLE 6

10 g of undyed silk cotton knitted goods are put in a bath which is prepared by adding 0.2 g of the trisazo compound in free form represented by the following formula:

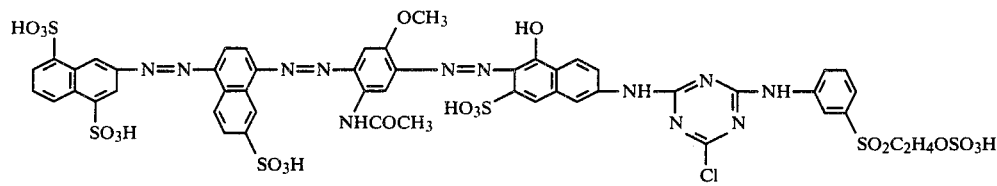

[λmax: 562 nm (water)]

16 g of sodium sulfate, 0.5 g of $Na_2HPO_4.12H_2O$ as a buffer and 0.02 g of $KH_2PO_4$ into 200 ml of water, and the bath is heated to 130° C. for 30 minutes. After dyeing for 30 minutes at the same temperature, the goods dyed are washed with water, soaped, washed with water and dried to give the dyed goods in deep blue. The pH of the bath is maintained at 8 from the beginning to the end of dyeing. The color of the dyed goods is extreme density and each of their light fastness, fastness to chlorine and fastness to light perspiration is fine.

Further, the trisazo compound used in the present example can be prepared by the following procedure: The disazo compound represented by the following formula:

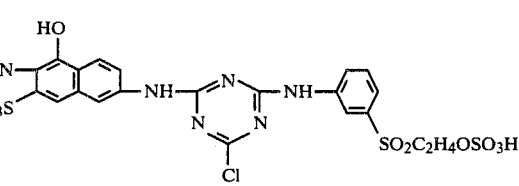

can be prepared by the usual diazotization and coupling of 18.0 g of 2-methoxy-5-acetylaminoaniline with the monoazo compound prepared by the usual diazotization and coupling of 30.3 g of 2-naphthylamine-4,8-disulfonic acid and 22.3 g of 1-naphthylamine-7-sulfonic acid. On the other hand, after condensing of 23.9 g of 2-amino-5-hydroxynaphthalene-7-sulfonic acid with 18.4 g of cyanuric chloride, the compound obtained is further condensed with 28.1 g of sulfonic acid ester 3-(β-hydroxyethyl)sulfonylaniline to prepare the compound represented by the following formula:

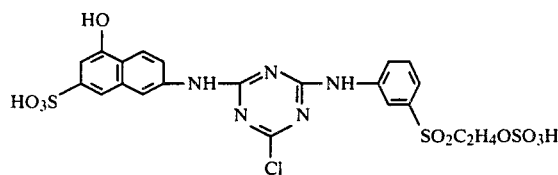
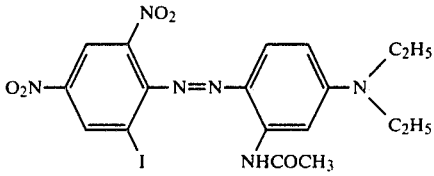

and then after diazotization and coupling of this compound with the disazo compound prepared previously, the reaction mixture is dried with spray to obtain the trisazo compound used in the present example.

EXAMPLE 7

10 g of mixed fiber of polyester with cotton (50:50) are put in a bath which is prepared by adding 0.2 g of the trisazo dye in free form represented by the following formula:

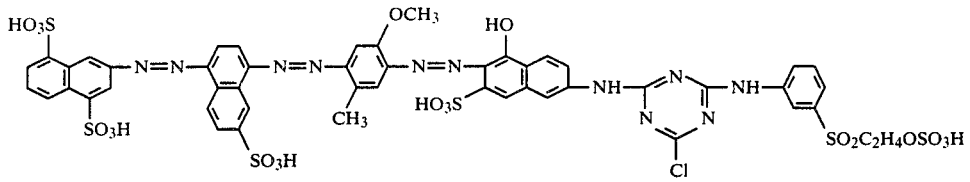

[λmax: 556 nm (water)]

0.2 g of the monoazo dye represented by the following formula:

12 g of sodium sulfate, 0.4 g of $Na_2HPO_4.12H_2O$ as a buffer and 0.1 g of $KH_2PO_4$ into 200 ml of water, the bath is heated to 130° C. for 30 minutes. After dyeing for 60 minutes at the same temperature, the goods dyed are washed with water, soaped, washed with water and dried to give the dyed goods in deep blue having a fine color equality. The pH of the bath is maintained at 8 from the beginning to the end of dyeing. Their exhaustibility is very fine, the color of the dyed goods is extreme density. Each of their light fastness, fastness to chlorine and fastness to light perspiration is fine.

Further, the trisazo compound used in the present example can be prepared by a similar manner to Example 6 except that 13.7 g of 2-methoxy-5-methylaniline is used in place of 18.0 g of 2-methoxy-5-acetylaminoaniline used in Example 6.

EXAMPLE 8

By a similar manner to Example 5 cottons are dyed with the trisazo compounds represented by the general formula (II-1), and the results obtained are shown in Table 2.

TABLE 2

(II-1)

[Structure: A-N=N-B(R6,R7)-N=N-C(R8,R9)-N=N-naphthalene(OH, SO3M, (SO3M)n)-NH-triazine(Z1)-NH-phenyl(R4,R5)-SO2C2H4OSO3M; A bears (SO3M)m']

| No. | A—(SO3M)m' | B (R6, R7) | C (R8, R9) | naphthalene-(SO3M)n | Z1 | phenyl (R4, R5)-SO2C2H4OSO3H | color of cotton | λmax (water) (nm) |
|---|---|---|---|---|---|---|---|---|
| 8-1 | 2-methyl-5-SO3H-phenyl (SO3H, HO3S) | 2,5-dimethyl-phenyl (CH3, CH3) | 2,5-dimethyl-phenyl (CH3, CH3) | 1-HO, 2-CH3, 3-SO3H, 6-SO3H, 8-CH3 naphthalene | —Cl | 3-(SO2C2H4OSO3H)-phenyl | deep blue | 566 |
| 8-2 | 2-methyl-5-SO3H-phenyl | 2-OCH3, 5-NHCOCH3-phenyl | 2-OCH3, 5-CH3-phenyl | 1-HO, 2-CH3, 3-SO3H, 6-SO3H, 8-CH3 naphthalene | —Cl | 3-(SO2C2H4OSO3H)-phenyl | greenish deep blue | 594 |
| 8-3 | 2-methyl-5-SO3H-phenyl | 2-OCH3, 5-CH3-phenyl | 2-OCH3, 5-CH3-phenyl | 1-HO, 2-CH3, 3-SO3H, 6-SO3H, 8-CH3 naphthalene | —Cl | 3-(SO2C2H4OSO3H)-phenyl | greenish deep blue | 586 |
| 8-4 | 3,5-di-SO3H-phenyl | 2-OC2H5, 5-CH3-phenyl | 2-OCH3, 5-CH3-phenyl | 1-HO, 2-CH3, 3-SO3H, 6-SO3H, 8-CH3 naphthalene | —NH2 | 4-(SO2C2H4OSO3H)-phenyl | greenish deep blue | 584 |

TABLE 2-continued

Structure (II-1): Complex azo dye with substituents $R^4$, $R^5$, $R^6$, $R^7$, $R^8$, $R^9$, $(SO_3M)_{m'}$, $(SO_3M)_n$, $MO_3S$, and $-SO_2C_2H_4OSO_3M$ group, with rings A, B, C and triazine bearing $Z^1$.

| No. | A-ring | B-ring | C-ring (naphthol) | $R^6/R^8$ | $R^5$/phenyl-SO$_2$C$_2$H$_4$OSO$_3$H | Color | λ (nm) |
|---|---|---|---|---|---|---|---|
| 8-10 | 2,4-di-SO$_3$H, methyl | 2-SO$_3$H naphthyl | 2,4-dimethyl | 1,5-di-methyl-4-HO-naphthalene-2-SO$_3$H (HO$_3$S) | —NH—C$_6$H$_4$—SO$_3$H | 2,4,5-tri-CH$_3$-phenyl-SO$_2$C$_2$H$_4$OSO$_3$H | deep blue | 565 |
| 8-11 | 2-SO$_3$H, 5-CH$_3$, 4-HO$_3$S | 2,4-di-CH$_3$ | 1-CH$_3$-naphthyl-SO$_3$H | HO-naphthalene-SO$_3$H (HO$_3$S) | —Cl | 3-CH$_3$-phenyl-SO$_2$C$_2$H$_4$OSO$_3$H | deep blue | 564 |
| 8-12 | 2-SO$_3$H, 5-CH$_3$, 4-HO$_3$S | 2,4-di-CH$_3$ | 1,8-di-CH$_3$-2-C$_2$H$_5$-naphthyl-SO$_3$H | HO-naphthalene-SO$_3$H (HO$_3$S) | —Cl | 4-CH$_3$-phenyl-SO$_2$C$_2$H$_4$OSO$_3$H | green | 602 |
| 8-13 | 2-SO$_3$H, 5-CH$_3$, 4-HO$_3$S | 2-SO$_3$H, 5-CH$_3$ | 1-OC$_2$H$_5$-naphthyl | HO-naphthalene-SO$_3$H (HO$_3$S) | —NH—C$_6$H$_4$—NO$_2$ | 2-SO$_3$H-4-CH$_3$-phenyl-SO$_2$C$_2$H$_4$OSO$_3$H | deep blue | 563 |
| 8-14 | 2-SO$_3$H, 5-CH$_3$, 4-HO$_3$S | 2-OCH$_3$, 5-CH$_3$ | 1-OC$_2$H$_5$-naphthyl-SO$_3$H | HO-naphthalene-SO$_3$H (HO$_3$S) | —NHC$_2$H$_4$OH | 3-CH$_3$-phenyl-SO$_2$C$_2$H$_4$OSO$_3$H | green | 601 |

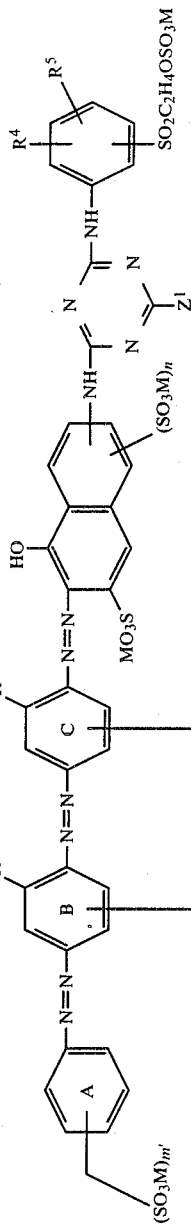

TABLE 2-continued

| No. | A (SO₃M)ₘ' | R⁶, R⁷ (ring B) | R⁸, R⁹ (ring C) | naphthol (SO₃M)ₙ | R⁴, R⁵ (ring, SO₂C₂H₄OSO₃M) | color | λmax (nm) |
|---|---|---|---|---|---|---|---|
| 8-15 | HO₃S-naphthalene-SO₃H (1,5,7-SO₃H) | 4-CH₃ | 2,5-(CH₃)₂ | HO-naphthalene-SO₃H with HO₃S | —Cl, 3-SO₂C₂H₄OSO₃H | deep blue | 570 |
| 8-16 | HO₃S-naphthalene-SO₃H | 2,5-(OCH₃)₂ | 2,5-(OCH₃)₂ | HO-naphthalene-SO₃H with HO₃S | —Cl, 3-SO₂C₂H₄OSO₃H | greenish deep blue | 588 |
| 8-17 | HO₃S-naphthalene-SO₃H | 2,5-(OCH₃)₂ | 2,5-(OCH₃)₂ | HO-naphthalene-SO₃H with HO₃S | —Cl, 3-SO₂C₂H₄OSO₃H | greenish deep blue | 588 |
| 8-18 | HO₃S-naphthalene-SO₃H | 2,5-(OCH₃)₂ | 2,5-(OCH₃)₂ | HO-naphthalene-SO₃H with HO₃S | —Cl, 3-SO₂C₂H₄OSO₃H | reddish deep blue | 560 |
| 8-19 | HO₃S-naphthalene-SO₃H | 2,5-(CH₃)₂ | 2,5-(CH₃)₂ | HO-naphthalene-SO₃H with HO₃S | —Cl, 4-SO₂C₂H₄OSO₃H | deep blue | 568 |

TABLE 2-continued (II-1)

| No. | A | B | C | (naphthol) | Z¹ | aryl | color | λ |
|---|---|---|---|---|---|---|---|---|
| 8-20 | HO₃S—naphthalene—(SO₃H)(SO₃H) | OCH₃, CH₃ | OCH₃, CH₃ | HO-naphthol-CH₃, HO₃S | —Cl | m-CH₃-C₆H₃-SO₂C₂H₄OSO₃H | reddish deep blue | 566 |
| 8-21 | HO₃S—naphthalene—(SO₃H)(SO₃H) | OCH₃, CH₃ | OC₂H₅, NHCOCH₃ | HO-naphthol-CH₃, HO₃S | —Cl | m-CH₃-C₆H₃-SO₂C₂H₄OSO₃H | deep blue | 576 |
| 8-22 | HO₃S—naphthalene—(SO₃H)(SO₃H) | OCH₃, CH₃ | CH₃, CH₃ | HO-naphthol-CH₃, HO₃S, SO₃H | —Cl | m-CH₃-C₆H₃-SO₂C₂H₄OSO₃H | greenish deep blue | 582 |
| 8-23 | HO₃S—naphthalene—(SO₃H)(SO₃H) | CH₃, CH₃ | CH₃, CH₃ | HO-naphthol-CH₃, HO₃S, SO₃H | —Cl | 2,5-(CH₃)₂-C₆H₂-SO₂C₂H₄OSO₃H (with CH₃) | deep blue | 564 |
| 8-24 | HO₃S—naphthalene—(SO₃H)(SO₃H) | CH₃, CH₃ | OCH₃, CH₃ | HO-naphthol-CH₃, HO₃S, SO₃H | —Cl | m-CH₃-C₆H₃-SO₂C₂H₄OSO₃H | greenish deep blue | 578 |

TABLE 2-continued (II-1)

[Structure showing general formula with rings A, B, C and substituents R⁴, R⁵, R⁶, R⁷, R⁸, R⁹, (SO₃M)ₙ, (SO₃M)ₘ', MO₃S, HO, NH, N=N groups, and SO₂C₂H₄OSO₃M terminal group with Z¹ substituent]

| No. | A (with SO₃M)ₘ' | R⁶ / B / R⁷ | R⁸ / C / R⁹ | (SO₃M)ₙ ring | Z¹ | R⁴, R⁵ ring | color | λ (nm) |
|---|---|---|---|---|---|---|---|---|
| 8-25 | naphthalene with HO₃S, HO₃S, SO₃H | 2,3-dimethylphenyl (CH₃, CH₃) | 2,5-dimethyl-4-OCH₃ phenyl | naphthol with HO, CH₃, HO₃S, SO₃H | —Cl | 3-CH₃-phenyl-SO₂C₂H₄OSO₃H | greenish deep blue | 580 |
| 8-26 | naphthalene with HO₃S, HO₃S, SO₃H | 4-methylphenyl | 2,5-dimethyl-4-OCH₃ phenyl | naphthol with HO, CH₃, HO₃S, SO₃H | —Cl | 3-CH₃-phenyl-SO₂C₂H₄OSO₃H | greenish deep blue | 585 |
| 8-27 | naphthalene with HO₃S, SO₃H, HO₃S | 2,3-dimethylphenyl (CH₃) | 2,5-dimethyl-4-OCH₃ phenyl | naphthol with HO, CH₃, HO₃S, SO₃H | —NHC₄H₉(n) | 4-phenyl-SO₂C₂H₄OSO₃H | greenish deep blue | 586 |
| 8-28 | naphthalene with HO₃S, HO₃S, SO₃H, CH₃ | 2,5-dimethylphenyl (CH₃, CH₃) | 2,5-dimethyl-4-C₄H₉(n) phenyl | naphthol with CH₃, HO, SO₃H, HO₃S | —NH-(4-Cl-phenyl) | 2,4-di-OCH₃-phenyl-SO₂C₂H₄OSO₃H (with CH₃) | deep blue | 568 |
| 8-29 | naphthalene with HO₃S, HO₃S, SO₃H, CH₃ | naphthalene-SO₃H (with CH₃, CH₃) | 2-OCH₃-5-NHCOCH₃-phenyl (CH₃) | naphthol with CH₃, HO, CH₃, SO₃H, HO₃S | —Cl | 3-phenyl-SO₂C₂H₄OSO₃H | deep blue | 579 |

TABLE 2-continued (II-1) structure: A ring with (SO₃M)ₘ' — N=N — B ring (R⁶, R⁷) — N=N — C ring (R⁸, R⁹) — N=N — naphthalene(OH, MO₃S, (SO₃M)ₙ) — NH — C(=N)—N=C(Z¹)—N (triazine) — NH — phenyl(R⁴, R⁵, SO₂C₂H₄OSO₃M)

| No. | A ring | B ring | R⁶/R⁷ | C ring | R⁸/R⁹ | naphthol | Z¹ | phenyl | color | λ |
|---|---|---|---|---|---|---|---|---|---|---|
| 8-30 | 1,5-disulfonaphthyl (HO₃S, SO₃H) | naphthyl-SO₃H (with CH₃) | — | OCH₃, NHCOCH₃ (with CH₃) | — | HO-naphthyl-SO₃H (HO₃S) | —F | m-tolyl-SO₂C₂H₄OSO₃H | deep blue | 562 |
| 8-31 | 1,5-disulfonaphthyl (HO₃S, SO₃H) | naphthyl-SO₃H (with CH₃) | — | OC₂H₅, CH₃ (with CH₃) | — | HO-naphthyl-SO₃H (HO₃S) | —Cl | m-tolyl-SO₂C₂H₄OSO₃H | deep blue | 556 |
| 8-32 | 1,5-disulfonaphthyl (HO₃S, SO₃H) | naphthyl-SO₃H (with CH₃) | — | OCH₃, CH₃ (with CH₃) | — | HO-naphthyl-SO₃H (HO₃S) | —NH-C₆H₄-SO₃H | m-tolyl-SO₂C₂H₄OSO₃H | deep blue | 552 |
| 8-33 | 2,6-disulfonaphthyl (HO₃S, HO₃S) | naphthyl-SO₃H (with CH₃) | — | OC₂H₅, NHCOCH₃ (with CH₃) | — | HO-naphthyl-SO₃H (HO₃S) | —Cl | p-tolyl-SO₂C₂H₄OSO₃H | deep blue | 562 |
| 8-34 | 2,6-disulfonaphthyl (HO₃S, SO₃H) | naphthyl-SO₃H (HO₃S) | — | OCH₃, CH₃ (with CH₃) | — | HO-naphthyl-SO₃H (HO₃S, SO₃H) | —Cl | m-tolyl-SO₂C₂H₄OSO₃H | green | 590 |

TABLE 2-continued

Structure (II-1) shown with groups A, B, C bearing substituents $(SO_3M)_{m'}$, $R^6$, $R^7$, $R^8$, $R^9$, $(SO_3M)_n$, and the coupling component with $R^4$, $R^5$, $SO_2C_2H_4OSO_3M$, $Z^1$.

| No. | A | B | C | Naphthol coupler | $R^8$/other | Aryl (with $SO_2C_2H_4OSO_3H$) | $Z^1$ group | Color | λ (nm) |
|---|---|---|---|---|---|---|---|---|---|
| 8-35 | naphthalene-1,5-(SO₃H)₂ | 2-SO₃H-naphthyl (with CH₃) | 2,5-(CH₃)₂ | HO, HO₃S-naphthol-SO₃H | — | 3-CH₃-C₆H₃-SO₂C₂H₄OSO₃H | —Cl | deep blue | 586 |
| 8-36 | 1-SO₃H, 5-SO₃H-naphthyl | 2-SO₃H-naphthyl (CH₃) | 4-OCH₃, 2-CH₃ | HO, HO₃S-naphthol | —NH-C₆H₄-SO₃H | 3-CH₃-C₆H₃-SO₂C₂H₄OSO₃H | | deep blue | 560 |
| 8-37 | naphthalene-SO₃H,SO₃H | 2-SO₃H-naphthyl (CH₃) | OCH₃, NHCOCH₃ | HO, HO₃S-naphthol | —Cl | 3-CH₃-C₆H₃-SO₂C₂H₄OSO₃H | | deep blue | 576 |
| 8-38 | naphthalene-(SO₃H)₂ | 2-SO₃H-naphthyl (CH₃) | OCH₃, CH₃ | HO, HO₃S-naphthol-SO₃H (CH₃) | —NHC₂H₄CN | 2,4-(CH₃)-C₆H₃-SO₂C₂H₄OSO₃H | | green | 593 |
| 8-39 | naphthalene-(SO₃H)₂ | 2,5-(CH₃)₂-phenyl | C₂H₅, CH₃-naphthyl-SO₃H | HO, HO₃S-naphthol-SO₃H (CH₃) | —F | 4-CH₃-C₆H₄-SO₂C₂H₄OSO₃H | | green | 602 |

TABLE 2-continued

Structural formula (II-1) with rings A, B, C, substituents $R^4$, $R^5$, $R^6$, $R^7$, $R^8$, $R^9$, $(SO_3M)_{m'}$, $(SO_3M)_n$, and $SO_2C_2H_4OSO_3M$ group; triazine ring with $Z^1$.

Due to the complexity of rendering the full structural diagrams in this table, the compound entries 8-40 through 8-44 with their associated substituent structures and color/wavelength data are summarized below:

| No. | Color | λ (nm) |
|-----|-------|--------|
| 8-40 | deep blue | 567 |
| 8-41 | deep blue | 562 |
| 8-42 | reddish deep blue | 560 |
| 8-43 | deep blue | 590 |
| 8-44 | reddish deep blue | 568 |

TABLE 2-continued (II-1)

[Structure: A-phenyl with (SO₃M)ₘ'—N=N—B-phenyl(R⁶, R⁷)—N=N—C-phenyl(R⁸, R⁹)—N=N—naphthyl(OH, (SO₃M)ₙ, MO₃S)—NH—triazine(Z¹)—NH—phenyl(R⁴, R⁵, SO₂C₂H₄OSO₃M)]

| No. | A | B | C | Naphthol coupler | R⁴/R⁵ substitution | Color | λ (nm) |
|---|---|---|---|---|---|---|---|
| 8-45 | HO₃S-naphthyl-SO₃H | naphthyl-SO₃H (C₂H₅) | naphthyl-SO₃H (C₂H₅) | HO-naphthyl-SO₃H (HO₃S-) | —NH—C₆H₄—COOH, SO₂C₂H₄OSO₃H | greenish deep blue | 595 |
| 8-46 | HO₃S-naphthyl-SO₃H | naphthyl-SO₃H | naphthyl-SO₃H | HO-naphthyl-SO₃H (HO₃S-) | —NHC₃H₇(i), m-SO₂C₂H₄OSO₃H | deep blue | 585 |
| 8-47 | HO₃S-naphthyl(SO₃H)-SO₃H | naphthyl-SO₃H (OC₂H₅) | naphthyl-SO₃H (OC₂H₅) | HO-naphthyl (HO₃S-) | —Cl, 2,4-(CH₃)₂-C₆H₂—SO₂C₂H₄OSO₃H | deep blue | 563 |

EXAMPLE 9

10 g of undyed silk cotton knitted goods are put in a bath at pH 7 which is prepared by adding 0.2 g of the trisazo dye in free form represented by the following formula:

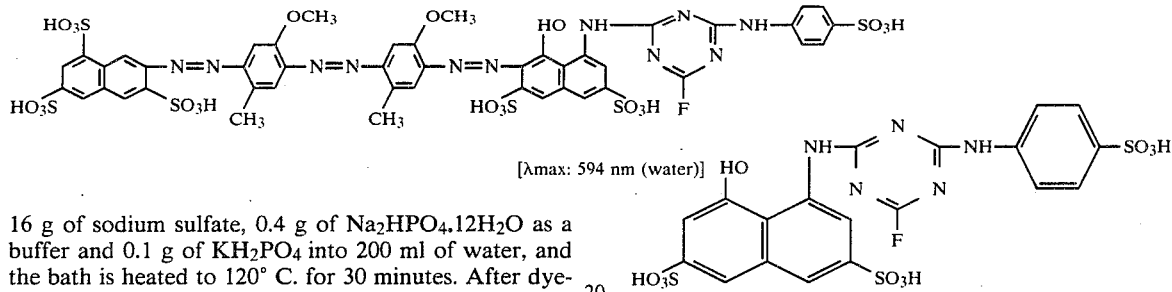

[λmax: 594 nm (water)]

16 g of sodium sulfate, 0.4 g of Na$_2$HPO$_4$.12H$_2$O as a buffer and 0.1 g of KH$_2$PO$_4$ into 200 ml of water, and the bath is heated to 120° C. for 30 minutes. After dyeing for 60 minutes at the same temperature, the goods dyed are washed with water, soaped, washed with water and dried to give the dyed goods in greenish deep blue. Their exhaustibility is very fine, the color of the dyed goods is extreme density. Each of their light fastness, fastness to chlorine and fastness to light perspiration is fine.

Further, the trisazo compound used in the present example can be prepared by the following procedure: The disazo compound represented by the following formula:

can be prepared by the usual diazotization and coupling of 13.7 g of 2-methoxy-5-methylaniline with the monoazo compound prepared by the diazotization and coupling of 38.3 g of 2-naphthylamine-3,6,8-trisulfonic acid with 13.7 g of 2-methoxy-5-methylaniline. On the other hand, after condensing of 31.9 g of 1-amino-8-hydroxynaphthalene-3,6-disulfonic acid with 13.5 g of cyanuric fluoride at 0° C. below, the compound obtained is condensed with 17.3 g of 4-aminobenzenesulfonic acid at 20° C. to prepare the compound represented by the following formula:

and then to this reaction solution, the diazo solution prepared from the disazo compound stated above by the usual diazotization in water-acetic acid medium is added. After coupling, the reaction mixture is salted out with potassium chloride to obtain the trisazo compound stated above.

EXAMPLE 10

10 g of undyed silk cotton knitted goods are put in a bath which is prepared by adding 0.2 g of the trisazo compound in free form represented by the following formula:

[λmax: 588 nm (water)]

16 g of sodium sulfate, 0.5 g of Na$_2$HPO$_4$.12H$_2$O as a buffer and 0.02 g of KH$_2$PO$_4$ into 200 ml of water, the bath is heated to 130° C. for 30 minutes. After dyeing for 30 minutes at the same temperature, the goods dyed are washed with water, soaped, washed with water and dried to give the dyed goods in deep blue. The pH of the bath is maintained at 8 from the beginning to the end of dyeing. The color of the dyed goods is extreme density. Each of their light fastness, fastness to chlorine and fastness to light perspiration is fine.

Further, the trisazo compound used in the present example can be prepared by the following procedure: The disazo compound represented by the following formula:

can be prepared by the usual diazotization and coupling of 18.0 g of 2-methoxy-5-acetylaminoaniline with the monoazo compound prepared by the usual diazotization and coupling of 25.3 g of aniline-2,5-disulfonic acid with 13.7 g of 2-methoxy-5-methylaniline. On the other hand, after condensing of 23.9 g of 2-amino-5-hydroxynaphthalene-7-sulfonic acid with 13.5 g of cyanuric fluoride, the compound obtained is further condensed with 17.3 g of 4-aminobenzenesulfonic acid to prepare the compound represented by the following formula:

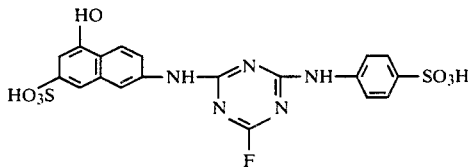

and then after diazotization and coupling of this compound with the disazo compound obtained previously, the reaction mixture is dried with spray to obtain the trisazo compound used in the present example.

EXAMPLE 11

10 g of mixed fiber of polyester with cotton (50:50) are put in a bath which is prepared by adding 0.2 g of the trisazo dye in free form represented by the following formula:

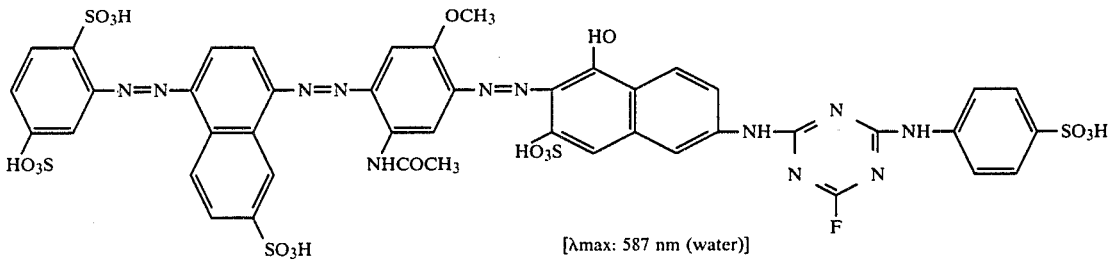

0.2 g of the monoazo dye represented by the following formula:

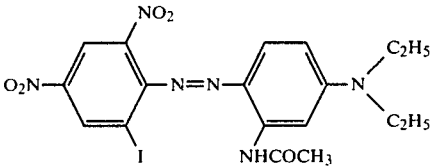

12 g of sodium sulfate, 0.4 g of $Na_2HPO_4 \cdot 12H_2O$ as a buffer and 0.1 g of $KH_2PO_4$ into 200 ml water, the bath is heated to 130° C. for 30 minutes. After dyeing for 60 minutes at the same temperature, the goods dyed are washed with water, soaped, washed with water and dried to give the dyed goods in deep blue having a fine color equality. The pH of the bath is maintained at 8 from the beginning to the end of dyeing. Their exhaustibility is very excellent and the color of the dyed goods is extreme density. Each of their light fastness, fastness to chlorine and fastness to light perspiration is fine.

Further, the trisazo compound used in the present example can be prepared by a similar manner to Example 10 except that 22.3 g of 1-naphthylamine-7-sulfonic acid is used in place of 13.7 g of 2-methoxy-5-methylaniline used in Example 10.

EXAMPLE 12

By a similar manner to Example 9 cottons are dyed with the trisazo compounds represented by the general formula (II-2), and the results obtained are shown in Table 3.

TABLE 3

$$\text{(II-2)}$$

Structure: A—N=N—B(R6,R7)—N=N—C(R8,R9)—NH—[triazine with X, Y]; with HO and SO3M on naphthalene bearing (SO3M)n; A bears (SO3M)m'.

| No. | A (SO3M)m' | B, R6, R7 | C, R8, R9 | naphthalene (SO3M)n | X | Y | color of cotton | λmax (water) (nm) |
|---|---|---|---|---|---|---|---|---|
| 12-1 | SO3H / HO3S-phenyl | CH3-phenyl-CH3 | CH3-phenyl-CH3 | HO, HO3S-naphthalene-SO3H | —Cl | —NH-phenyl-SO3H (m) | deep blue | 571 |
| 12-2 | SO3H / HO3S-phenyl | OCH3-phenyl-NHCOCH3 (CH3) | OCH3-phenyl-CH3 (CH3) | HO, HO3S-naphthalene-SO3H | —Cl | —NH-phenyl-SO3H (m) | greenish deep blue | 604 |
| 12-3 | SO3H / HO3S-phenyl | OCH3-phenyl-CH3 | OCH3-phenyl-CH3 | HO, HO3S-naphthalene-SO3H | —Cl | —NH-phenyl-SO3H (m) | greenish deep blue | 591 |

TABLE 3-continued (II-2)

| | A (SO₃M)ₘ' | R⁶ B R⁷ | R⁸ C R⁹ | naphthol component (SO₃M)ₙ | X | Y | shade | λmax |
|---|---|---|---|---|---|---|---|---|
| 12-4 | 3,5-di(SO₃H)-phenyl | 2-OC₂H₅, 5-CH₃-phenyl | 2-OCH₃, 5-CH₃-phenyl | 8-HO, 6-SO₃H naphthyl (2-) | —F | —NH-(4-SO₃H)phenyl | greenish deep blue | 594 |
| 12-5 | 2-SO₃H, 5-CH₃-phenyl (4-) | 2-CH₃, 5-CH₃-phenyl | 2-OCH₃, 5-CH₃-phenyl | 8-HO, 6-SO₃H naphthyl (2-) | —F | —NH-(2-OCH₃, 5-SO₃H, 4-OCH₃)phenyl | deep blue | 582 |
| 12-6 | 2-SO₃H, 5-CH₃-phenyl (4-) | 5,8-di-substituted naphthyl-2-SO₃H | 2-OCH₃, 5-CH₃-phenyl | 5-HO, 1-SO₃H naphthyl | —Cl | —NH-(3-SO₃H)phenyl | reddish deep blue | 566 |
| 12-7 | 2-SO₃H, 5-CH₃-phenyl (4-) | 5,8-di-methyl-2-SO₃H-naphthyl | 2-OC₄H₉(n), 5-CH₃-phenyl | 5-HO, 3-SO₃H naphthyl | —F | —NH-(4-SO₃H)phenyl | greenish deep blue | 596 |

TABLE 3-continued (Structural formula II-2 with rings A, B, C and substituents shown)

| No. | A | B | R⁶/R⁷ | C | R⁸/R⁹ | Naphthol part | X | Y | Color | λ |
|---|---|---|---|---|---|---|---|---|---|---|
| 12-8 | 2-methyl-4-sulfo-phenyl (SO₃H/HO₃S) | 5,8-disubst-naphthalene-2-SO₃H | OCH₃/CH₃ | | | HO-naphthol-SO₃H | —Cl | —NH(2-methyl-4-sulfophenyl) | reddish deep blue | 567 |
| 12-9 | 4-methyl-2-sulfo-phenyl | 5,8-disubst-naphthalene-2-SO₃H | OC₃H₇(n)/OC₃H₇(n) | | | HO-naphthol-SO₃H | —F | —NH₂ | green | 605 |
| 12-10 | 2-methyl-4-sulfo-phenyl | 5,8-disubst-naphthalene-2-SO₃H | CH₃/CH₃ | | | HO-naphthol-SO₃H | —F | —NHC₄H₉(n) | deep blue | 575 |

TABLE 3-continued

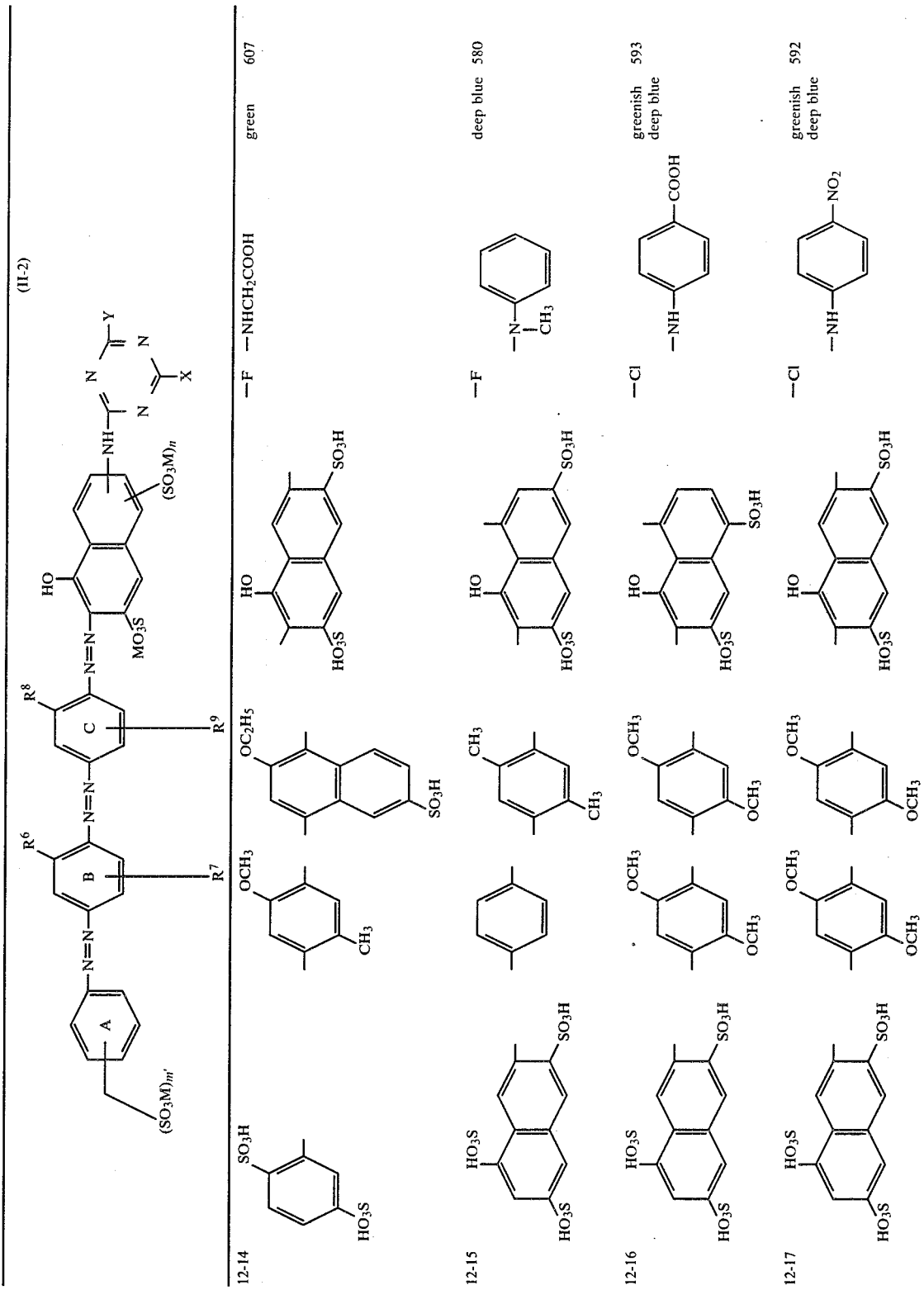

TABLE 3-continued (II-2) structure with A ring bearing (SO₃M)ₘ', then —N=N—B(R⁶,R⁷)—N=N—C(R⁸,R⁹)—N=N— to naphthalene with HO, SO₃M, (SO₃M)ₙ and —NH— linked to triazine with X, Y substituents.

| No. | A ring | R⁶ / B | R⁷ | R⁸ / C | R⁹ | Naphthol coupler | X | Y | Shade | λmax |
|---|---|---|---|---|---|---|---|---|---|---|
| 12-18 | 1,5-HO₃S / 6-SO₃H naphthyl | OCH₃ / 1,4-dimethoxyphenyl | OCH₃ | OCH₃ / 1,4-dimethoxyphenyl | OCH₃ | HO, SO₃H, HO₃S naphthyl | —F | —NH—C₆H₄—Cl | reddish deep blue | 570 |
| 12-19 | 1,5-HO₃S / 6-SO₃H naphthyl | CH₃ / tolyl | CH₃ | CH₃ / xylyl | CH₃ | HO, SO₃H, HO₃S naphthyl | —F | —O—C₆H₅ | deep blue | 579 |
| 12-20 | 1,5-HO₃S / 6-SO₃H naphthyl | OCH₃ / 1,4-disubstituted phenyl | CH₃ | OCH₃ / 1,4-disubstituted phenyl | CH₃ | HO, HO₃S naphthyl | —Cl | —NHCH₂CH₂SO₃H | reddish deep blue | 571 |
| 12-21 | 1,5-HO₃S / 6-SO₃H naphthyl | OCH₃ / 1,4-disubstituted phenyl | CH₃ | OC₂H₅ / phenyl with NHCOCH₃ | CH₃ | HO, HO₃S naphthyl | —Cl | —NH—C₆H₅ | deep blue | 580 |

TABLE 3-continued

Structure (II-2):

Compound of general formula with rings A, B, C connected by azo groups, naphthol coupler, and triazine with substituents X and Y.

| No. | A | B (R⁶, R⁷) | C (R⁸, R⁹) | Naphthol | X | Y | Color | λ (nm) |
|---|---|---|---|---|---|---|---|---|
| 12-22 | 5,7-disulfo-naphthyl | 2-OCH₃-5-CH₃ phenyl | 2,5-(CH₃)₂ phenyl | 1-OH-6-SO₃H-3-SO₃M naphthyl | —Cl | —NH—C₆H₄—SO₃H (p) | greenish deep blue | 586 |
| 12-23 | 5,7-disulfo-naphthyl | 2,5-(CH₃)₂ phenyl | 2,5-(CH₃)₂ phenyl | 1-OH-6-SO₃H-3-SO₃M naphthyl | —F | —OCH₃ | deep blue | 572 |
| 12-24 | 5,7-disulfo-naphthyl | 2,5-(CH₃)₂ phenyl | 2-OCH₃-5-CH₃ phenyl | 1-OH-6-SO₃H-3-SO₃M naphthyl | —F | —NH—C₆H₃(SO₃H)(OCH₃) | greenish deep blue | 585 |
| 12-25 | 5,7-disulfo-naphthyl | 3-CH₃ phenyl | 2-OCH₃-5-CH₃ phenyl | 1-OH-6-SO₃H-3-SO₃M naphthyl | —Cl | —NH—C₆H₃(SO₃H)(CH₃) | greenish deep blue | 586 |

TABLE 3-continued (II-2) structure with groups A, B, C bearing substituents $R^6, R^7, R^8, R^9$, $(SO_3M)_{m'}$, $(SO_3M)_n$, linked by azo bonds to a naphthalene system with OH, $MO_3S$, NH-triazine (X, Y).

| No. | A | B | C | Naphthalene | X | Y | Color | λ |
|-----|---|---|---|---|---|---|---|---|
| 12-26 | 2,6-disulfo naphthyl (HO₃S, HO₃S) | phenyl | 4-OCH₃, 2-CH₃ phenyl | HO, HO₃S, SO₃H naphthyl | —Cl | —NH-(3-SO₃H phenyl) | greenish deep blue | 589 |
| 12-27 | 1,5-disulfo naphthyl | 2-CH₃ phenyl | 4-OCH₃, 2-CH₃ phenyl | HO, HO₃S, SO₃H naphthyl | —F | —NH-(3-OCH₃ phenyl) | greenish deep blue | 593 |
| 12-28 | 2,6-disulfo naphthyl | 2,5-di-CH₃ phenyl | 4-C₄H₉(n), 2-CH₃ phenyl | HO, HO₃S, SO₃H naphthyl | —F | —N(CH₃)₂ | deep blue | 575 |
| 12-29 | 2,6-disulfo naphthyl | 5,8-disulfo-naphthyl (SO₃H) | 4-OCH₃, 2-NHCOCH₃ phenyl | HO, HO₃S, SO₃H naphthyl | —Cl | —NH-(3-SO₃H phenyl) | deep blue | 583 |

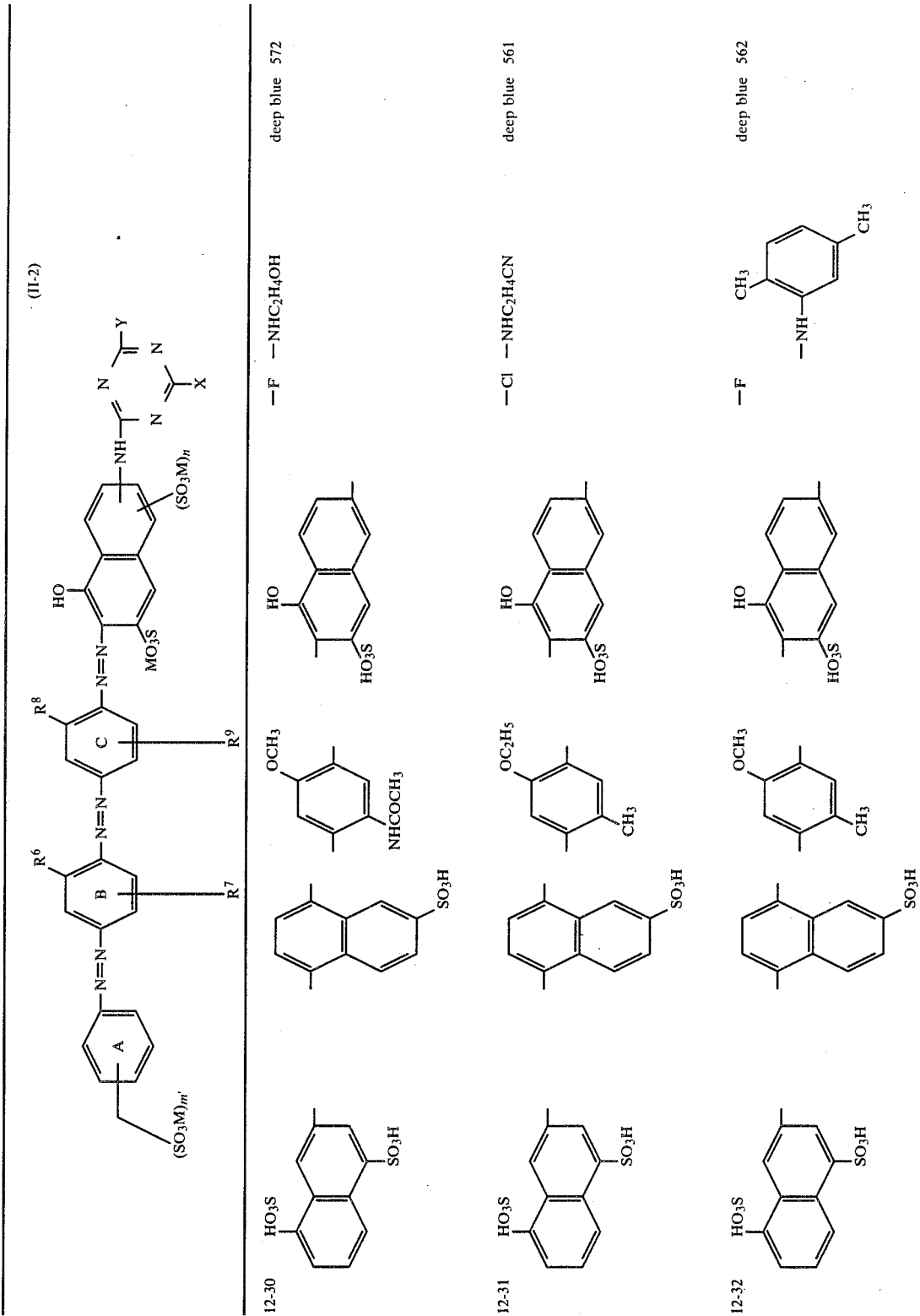

TABLE 3-continued (II-2)

| | A | B | R⁶, R⁷ | C | R⁸, R⁹ | X | Y | color | λ |
|---|---|---|---|---|---|---|---|---|---|
| 12-33 | 2,6-disulfonaphthyl | 5,8-disulfonaphth-2-yl | — | 4-ethoxy-2-acetamido | — | —Cl | —OCH₃ | deep blue | 571 |
| 12-34 | 2,6-disulfonaphthyl | 5-sulfonaphth-2-yl | — | 4-methoxy-2-methyl | — | —Cl | p-carboxyanilino | deep blue | 593 |
| 12-35 | 2,6-disulfonaphthyl | 5-sulfonaphth-2-yl | — | 2,5-dimethyl | — | —F | p-sulfoanilino | deep blue | 589 |

(Table values transcribed from structural drawings; see original for exact substituent structures.)

TABLE 3-continued
(II-2)
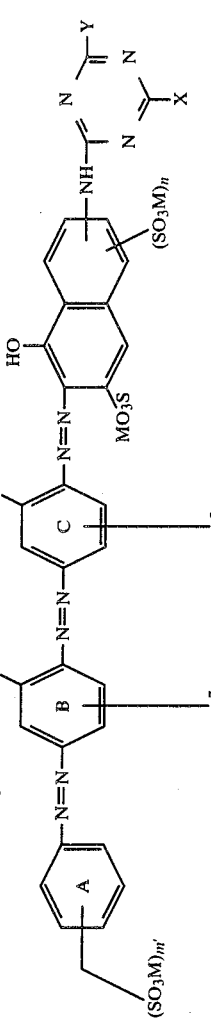
| | A (SO₃M)ₘ' | B R⁶/R⁷ | C R⁸/R⁹ | naphthol | NH-triazine | colour | λ |
|---|---|---|---|---|---|---|---|
| 12-36 | 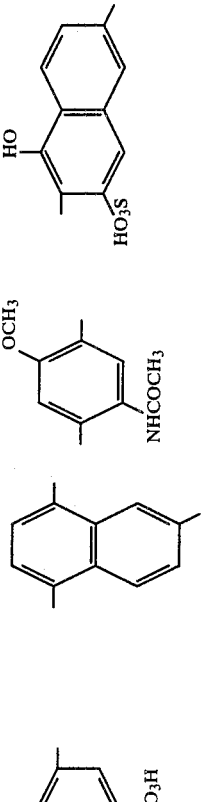 | naphthalene-SO₃H (5,8-di) | OCH₃ / NHCOCH₃ | 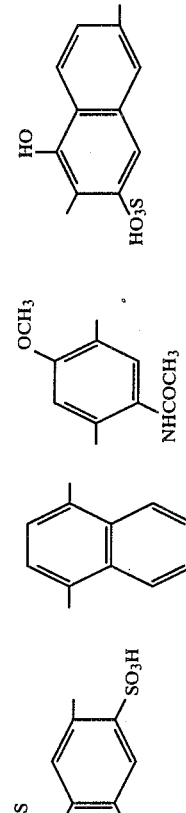 | —F, —NH-C₆H₄-NO₂ | deep blue | 568 |
| 12-37 | 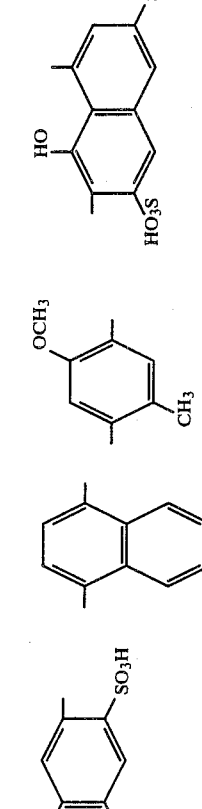 | naphthalene-SO₃H | OCH₃ / NHCOCH₃ | 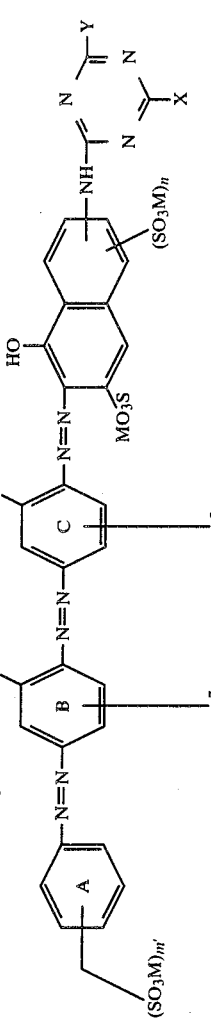 | —Cl, —NH-C₆H₃(Cl)(SO₃H) | deep blue | 581 |
| 12-38 | 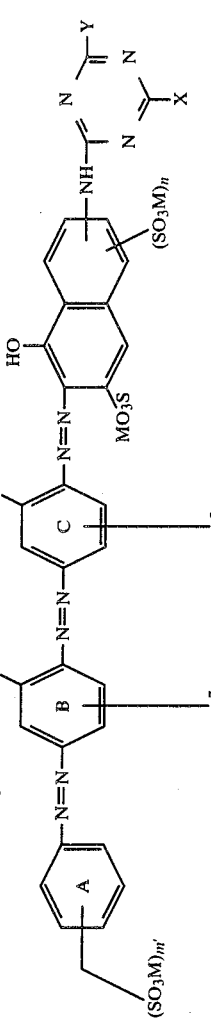 | naphthalene-SO₃H | OCH₃ / CH₃ | 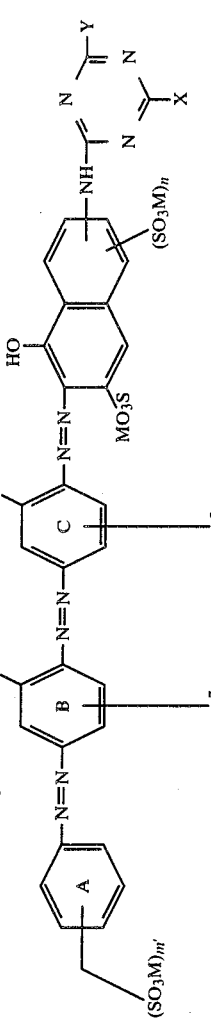 | —F, —NHC₂H₅ | deep blue | 598 |

TABLE 3-continued
(II-2)
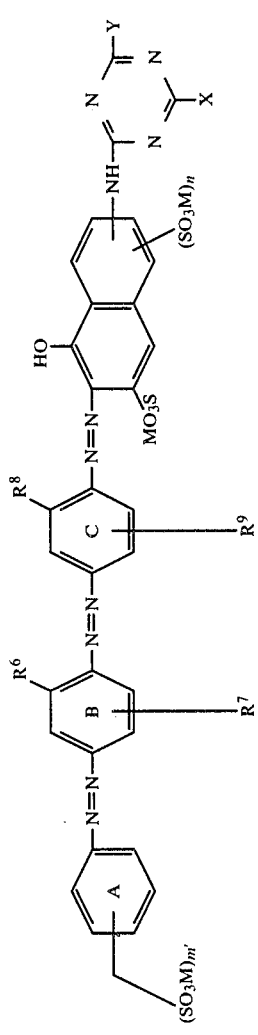
| | A | B | R⁶ | R⁷ | C | R⁸ | R⁹ | | X | Y | |
|---|---|---|---|---|---|---|---|---|---|---|---|
| 12-39 | 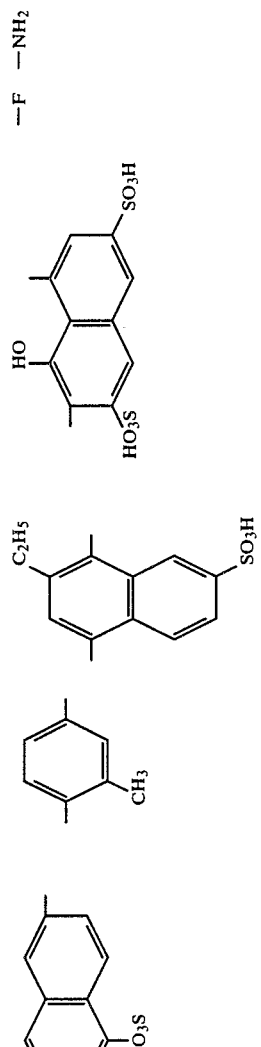 | 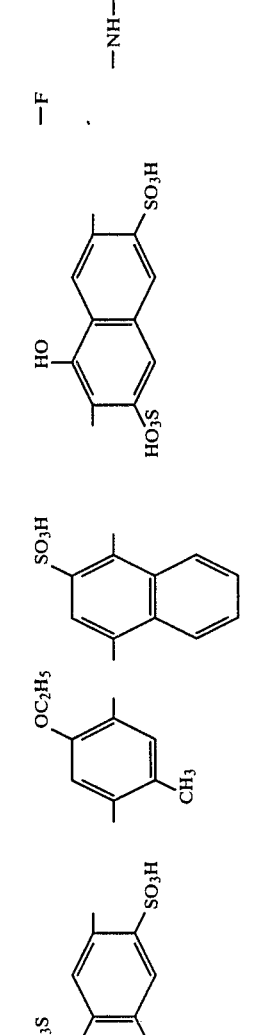 | | | 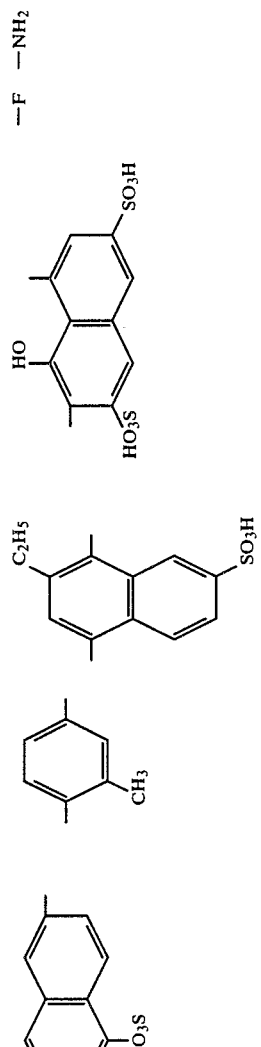 | | | 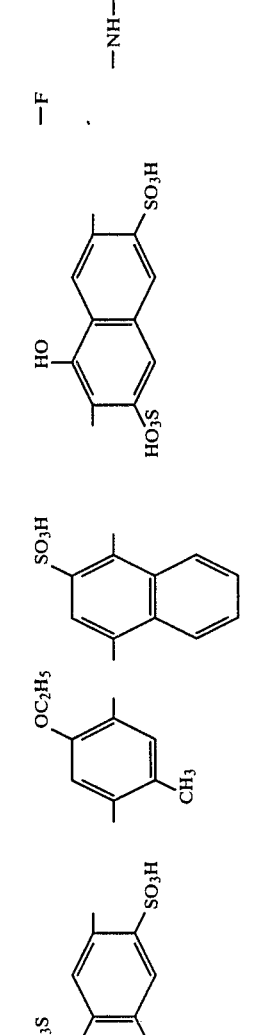 | —F | —NH₂ | deep blue 612 |
| 12-40 | 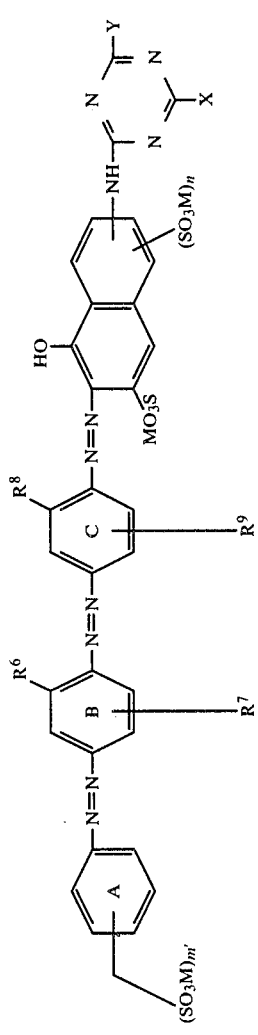 | 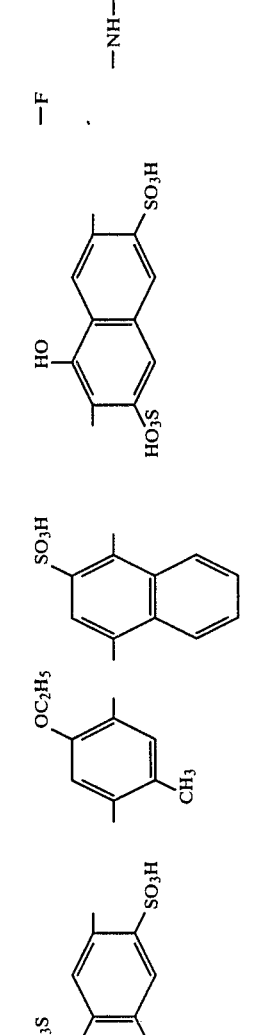 | | | 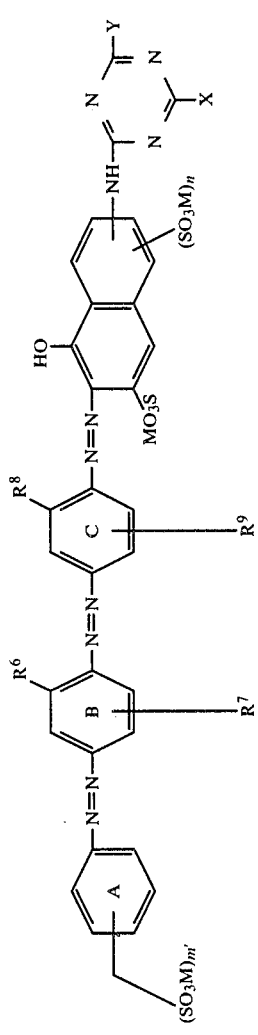 | | | 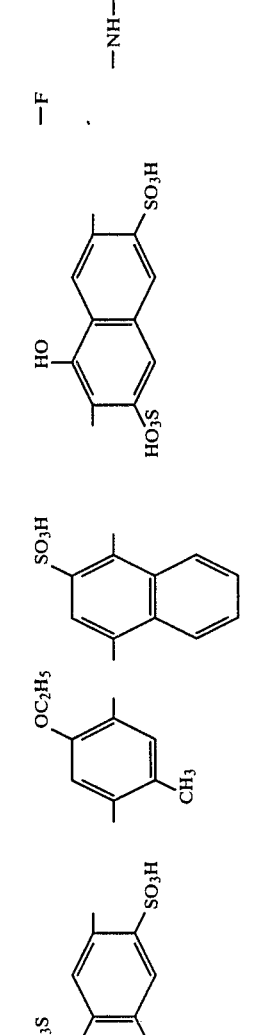 | —F | 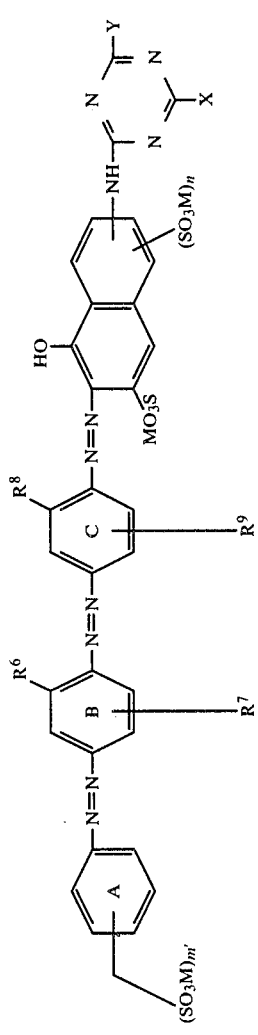 | deep blue 575 |
| 12-41 | 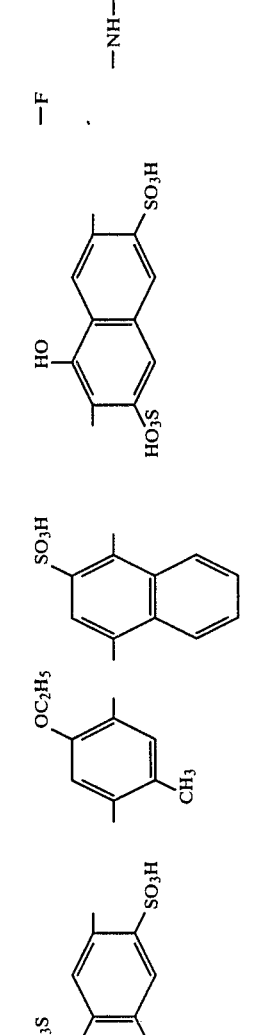 | 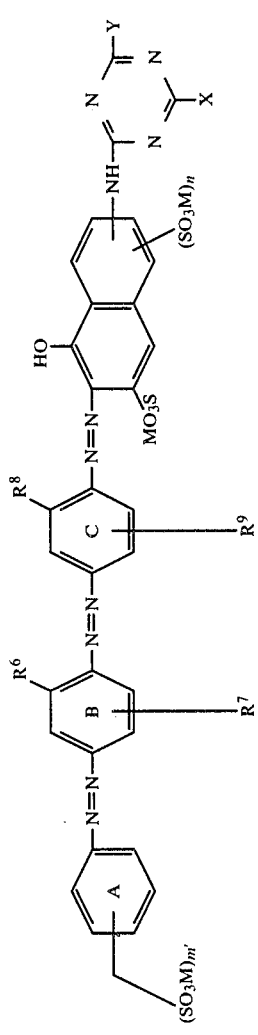 | | | 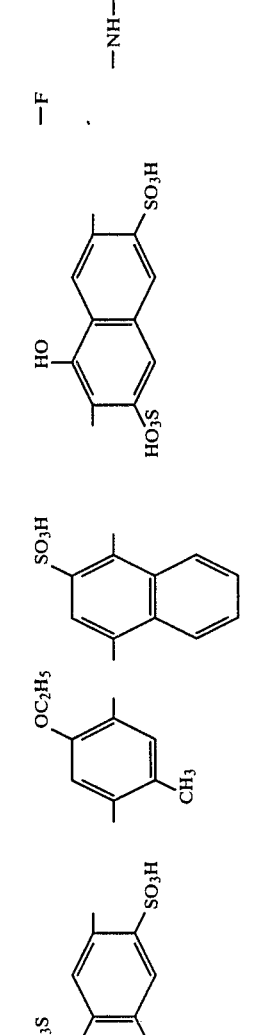 | | | 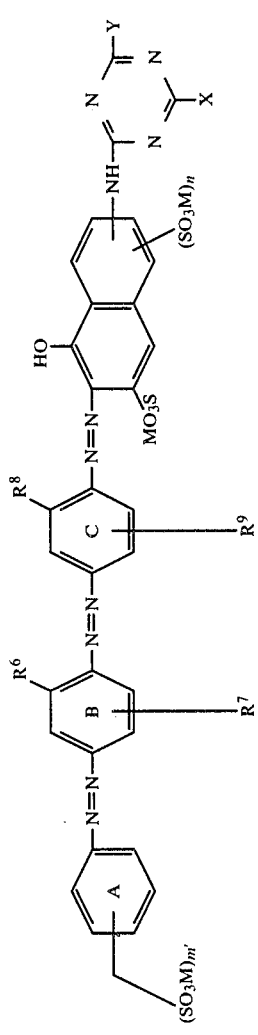 | —Cl | 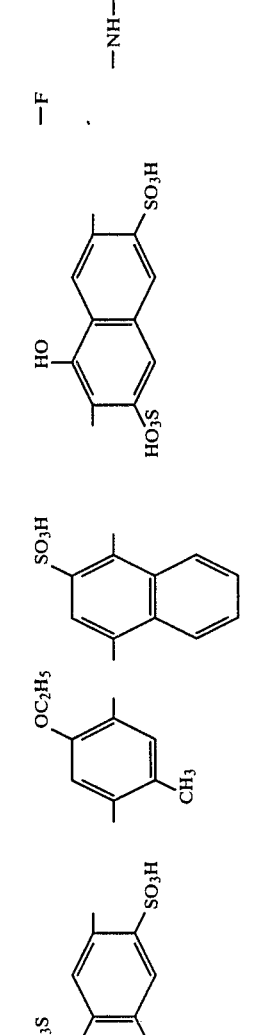 | deep blue 567 |

TABLE 3-continued (II-2)

[Structure II-2 with groups A (SO₃M)ₘ', B with R⁶/R⁷, C with R⁸/R⁹, naphthalene with OH, MO₃S, (SO₃M)ₙ, NH-triazine with X, Y]

| | A | R⁶ | R⁷ | R⁸ | R⁹ | X | Y | |
|---|---|---|---|---|---|---|---|---|
| 12-42 | HO₃S-naphthalene-SO₃H | OCH₃ | CH₃ | C₂H₅ | naphthalene | HO-naphthalene(SO₃H)(SO₃H) | —F | —NHC₂H₄SO₃H | reddish deep blue 570 |

While the invention has been described in detail and with reference to specific embodiments thereof, it will be apparent to one skilled in the art that various changes and modifications can be made therein without departing from the spirit and scope thereof.

What is claimed is:

1. A reactive azo dye represented by the following formula:

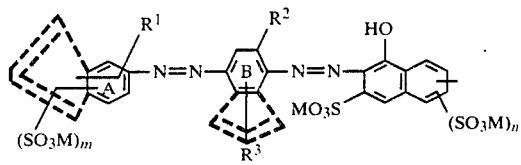

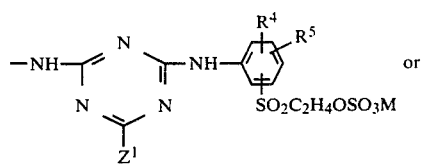  or

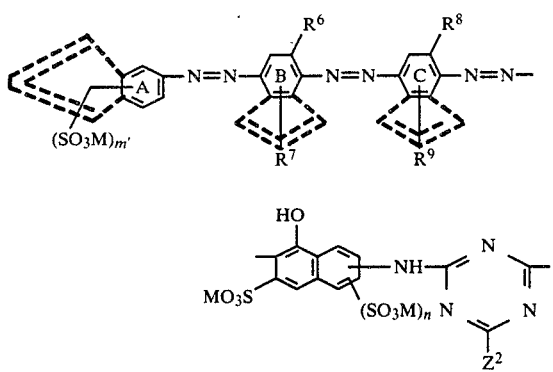

wherein M represents hydrogen or alkali metal; $R^1$ represents hydrogen, chlorine, lower alkyl, lower alkoxy, nitro, carboxy; $R^2$ and $R^8$ represent lower alkyl, lower alkoxy or sulfonic acid; $R^3$, $R^7$ and $R^9$ represent hydrogen, lower alkyl, lower alkoxy, acetylamino or sulfonic acid; $R^4$ and $R^5$ represent hydrogen, methyl, methoxy or sulfonic acid; $R^6$ represents hydrogen, lower alkyl, lower alkoxy or sulfonic acid; $Z^1$ represents chlorine, fluorine, aliphatic or atomic amino group, methoxy or phenoxy; $Z^2$ represents the same as $Z^1$ when $Z^3$ represents

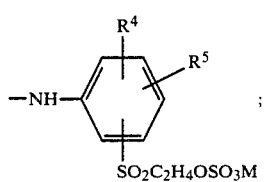

$Z^2$ represents chlorine or fluorine when $Z^3$ represents aliphatic amino group, aromatic amino group except

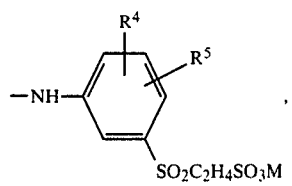

methoxy or phenoxy; $Z^3$ is

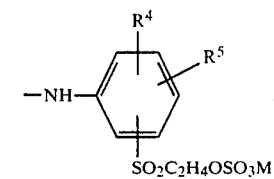

aliphatic amino group, aromatic amino group except

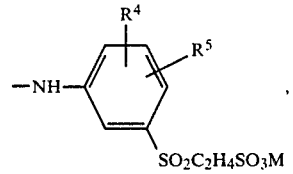

methoxy, or phenoxy; m represents 1, 2 or 3; m' represents 2 or 3; n represents 0 or 1, and the rings A, B and C each represent a benzene ring or naphthalene ring, wherein the aliphatic and aromatic amino residue represented by $Z^1$, $Z^2$ and $Z^3$ are —$NH_2$, alkylamino having 1 to 4 carbon atoms, ethanol-amino, β-cyanoethylamino, β-sulfoethylamino, —$NHCH_2COOH$, anilino or anilino substituted with sulfo, chlorine, lower alkyl, lower alkoxy, nitro or carboxyl.

2. The reactive azo dye as claimed in claim 1 represented by formula:

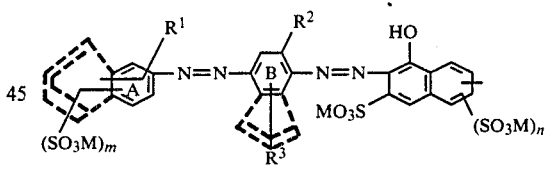

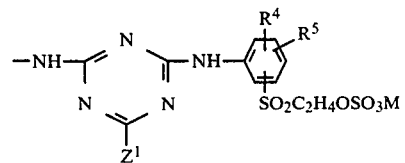

wherein $R^1$, $R^2$, $R^3$, $R^4$, $R^5$, M, m, n and $Z^1$ have the same meanings as defined in claim 1.

3. The reactive azo dye as claimed in claim 1 represented by formula:

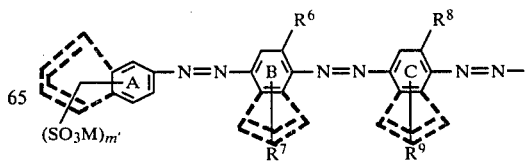

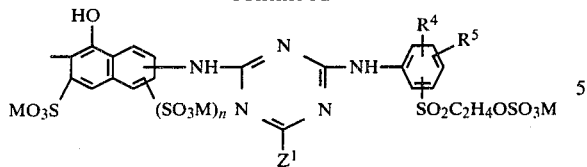

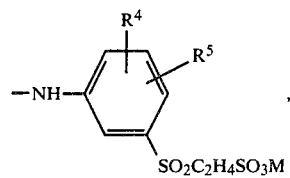

wherein $R^4$, $R^5$, $R^6$, $R^7$, $R^8$, $R^9$, M, $Z^1$, m' and n have the same meanings as defined in claim 1.

4. The reactive azo dye as claimed in claim 1 represented by formula:

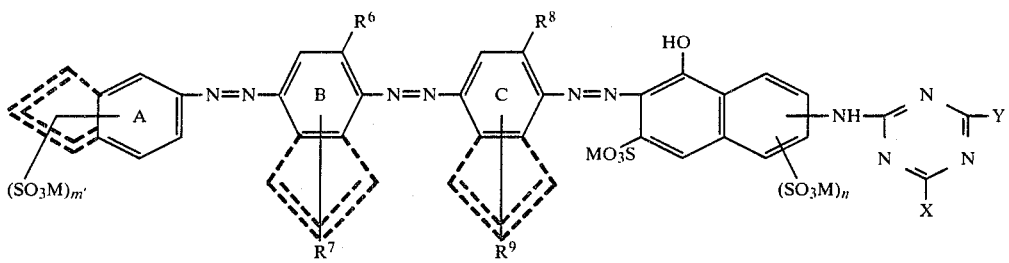

wherein X represents chlorine or fluorine; Y is aliphatic amino group, aromatic amino group except methoxy or phenoxy; and $R^6$, $R^7$, $R^8$, $R^9$, M, m' and n have the same meanings as defined in claim 1.

5. The reactive azo dye as claimed in claim 1, wherein said lower alkyl and alkoxy represented by $R^1$, $R^3$, $R^6$, $R^7$, $R^8$ and $R^9$ is alkyl or alkoxy having 1 to 4 carbon atoms.

6. The reactive azo dye as claimed in claim 1, wherein said alkali metal represented by M is sodium or potassium.

* * * * *